(12) United States Patent
Ebner et al.

(10) Patent No.: US 6,228,284 B1
(45) Date of Patent: *May 8, 2001

(54) OXYGEN SCAVENGING COMPOSITIONS WITH LOW MIGRATION

(75) Inventors: Cynthia Louise Ebner, New Market; Thomas Andrew Blinka, Columbia, both of MD (US)

(73) Assignee: W. R. Grace & Co.-Conn, Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/183,239

(22) Filed: Oct. 30, 1998

Related U.S. Application Data

(60) Division of application No. 08/753,990, filed on Dec. 3, 1996, which is a continuation-in-part of application No. 08/573,335, filed on Dec. 15, 1995, now abandoned, and a continuation-in-part of application No. 08/573,086, filed on Dec. 15, 1995, now abandoned, and a continuation-in-part of application No. 08/573,338, filed on Dec. 15, 1995, now abandoned.

(51) Int. Cl.⁷ .................................. C02F 1/70; B32B 3/02
(52) U.S. Cl. .................................... 252/188.28; 428/35.8; 428/457; 426/118; 426/395; 206/524.1; 206/524.4

(58) Field of Search .................................. 428/34.1, 357, 428/35.8, 457; 252/188.28; 426/118, 395; 220/23.83, 23.86; 206/524.4, 524.1, 204

(56) References Cited

U.S. PATENT DOCUMENTS

| 4,384,972 | * | 5/1983 | Nakamura et al. | 252/188.21 |
| 5,075,362 | * | 12/1991 | Hofeldt et al. | 524/72 |
| 5,202,052 | * | 4/1993 | Zenner et al. | 252/188.28 |
| 5,364,555 | * | 11/1994 | Zenner et al. | 252/188.28 |
| 5,977,212 | * | 11/1999 | Ebner et al. | 523/210 |

FOREIGN PATENT DOCUMENTS

WO 91/17044A1 * 11/1991 (WO).

* cited by examiner

Primary Examiner—Ellis Robinson
Assistant Examiner—John J. Figueroa
(74) Attorney, Agent, or Firm—Howard Troffkin

(57) ABSTRACT

An improved oxygen scavenging composition and packaging container formed therefrom is disclosed. The container is suitable for storage of oxygen sensitive materials and has as part of its exposed interior surface a composition composed of a polymeric matrix with a oxygen scavenger and a substantially water-insoluble transition metal containing compound distributed therein.

23 Claims, 1 Drawing Sheet

OXYGEN SCAVENGING COMPOSITIONS WITH LOW MIGRATION

This application is a divisional of application Ser. No. 08/753,990 filed Dec. 3, 1996 which is a continuation-in-part application of applications Ser. No. 08/573,335 filed Dec. 15, 1995 abandoned; U.S. Ser. No. 08/573,086, filed Dec. 15, 1995 abandoned; and U.S. Ser. No. 08/573,338 filed Dec. 15, 1995 abandoned. The disclosures of each of said applications is incorporated herein by reference to the extent not inconsistent with the present application.

BACKGROUND OF THE INVENTION

The present invention relates to oxygen scavenging compositions, to polymeric compositions containing said oxygen scavenging compositions, and further to intermediate shaped structures, e.g., films, coatings, 3-dimensional solids, fibers, webs, and the like, which contain such polymeric compositions, as well as to shaped products, into or onto, which such compositions or structures are incorporated or applied, respectively, e.g., containers, having the subject compositions incorporated as part of or attached to the container's structure.

The oxygen scavenging composition comprises a carrier which contains (a) a non-polymeric oxygen scavenger and (b) a water-insoluble oxygen scavenging catalyst having higher affinity to organics than to water. More specifically, the catalyst is composed of a water-insoluble, compound of a transition metal. The present oxygen scavenging composition provides effective absorption of oxygen from the interior of a container without adversely affecting the color, taste or smell of the packaged material contained therein.

In order to enhance preservation, it is standard practice to package food and other materials within laminated packaging material that generally includes a barrier layer, that is, a layer having a low permeability to oxygen. The sheet material can be thin, in which event it is wrapped around the material being packaged, or it can be sufficiently thick that it forms a container body that is provided with a lid or other separate closure. The polymeric sheet material may constitute most or all of the interior exposed surface area of the container.

It is known to include an oxygen scavenger in a sheet material. The oxygen scavenger reacts with oxygen that is trapped in the package or that permeates into the package. This is described in, for instance, U.S. Pat. Nos. 4,536,409 and 4,702,966 and the prior art discussed in these references. For instance, U.S. Pat. No. 4,536,409 describes cylindrical containers formed from such sheet material and provided with metal lids.

When the container is formed of a glass or metal body and is provided with a hermetically sealed metal closure, the permeation of oxygen through the body and the closure is theoretically impossible because of the impermeability of the materials from which the body and closure are formed. As a practical matter, metal cans can reliably prevent oxygen ingress. However, some oxygen ingress may occur by diffusion through the gasket or the like positioned between a container body and its lid. It has long been recognized that when conventional containers of these types are used for the storage of oxygen sensitive materials, the shelf life of the stored materials is very limited. The quality of the packaged material tends to deteriorate over time, in part because dissolved oxygen typically is present in the pack from the time it is filled; and in part due to oxygen ingress which occurs during storage.

When the container is in the form of a can, the can end or other closure in many instances includes push components or pull components which are intended to be, respectively, pushed or pulled in order to allow removal of the fluid or other material in the container without removing the entire closure from the container. These push or pull components are often defined by discontinuities or lines of weakness in the panel of the closure. Problems that can arise at these lines of weakness or discontinuities include the risk of permeation of oxygen into the container and the risk of corrosion of the metal where the normal protective lacquer coating is ruptured at the lines of weakness or at the discontinuities.

It would be very desirable to be able to improve the shelf life significantly while continuing to use conventional materials for the formation of the container body, the container closure and, where applicable, the gasket between the body and closure.

Various types of oxygen scavengers have been proposed for this purpose. For example, it is well known to package iron powder in a sachet for use with dry foods. See Mitsubishi Gas Chemical Company, Inc.'s literature titled "Ageless®—A New Age in Food Preservation" (date unknown). However, these materials require the addition of water soluble salts to enhance the oxygen scavenging rate and, in the presence of moisture, the salts and iron tend to migrate into liquids, producing off-flavors. Similarly, U.S. Pat. No. 4,536,409 issued to Farrell et al. recommends potassium sulphite as a scavenger, with similar results. U.S. Pat. No. 5,211,875 issued to Speer et al. discloses the use of unsaturated hydrocarbons as oxygen scavengers in packaging films.

It is known in the art that ascorbate compounds (ascorbic acid, its salts, optical isomers, and derivatives thereof), as well as sulfite salts can be oxidized by molecular oxygen, and can thus serve as components of an oxygen scavenging formulation, for example, as a component of a closure compound. For example, U.S. Pat. No. 5,075,362, issued to Hofeldt et al., discloses the use of ascorbates in container closures as oxygen scavengers.

U.S. Pat. No. 5,284,871 issued to Graf relates to the use of an oxygen scavenging composition made of a solution of a reducing agent and a dissolved species of copper which is blended into foods, cosmetics and pharmaceuticals. $Cu^{2+}$ ascorbate is used in the examples. The reference teaches that most reducing agents require a transition metal to catalyze oxygen absorption at usable rates (Col. 3, lines 32–38). However, the reference indicates that a relatively high level of $Cu^{2+}$ (~5 ppm) are required in the food for scavenging to be effective but indicates that small amounts of $Cu^{2+}$ and oxygen in food will cause food spoilage. In order to avoid spoilage, one is required to reduce headspace $O_2$ or partially flush the container with an inert gas (Col. 5, lines 32–39).

A paper by E. Graf, "Copper (II) Ascorbate: A Novel Food Preservation System", Journal of Agricultural Food Chemistry, Vol. 42, pages 1616–1619 (1994) identifies copper gluconate as a preferred raw material.

It is also well known in the scientific literature (See "Polymer Compositions Containing Oxygen Scavenging Compounds", Teumac, F. N.; et al. WO 91/17044, published Nov. 4, 1991, filed on May 1, 1991) that the oxidation rate of ascorbate compounds can be increased significantly by the use of catalysts. Typical oxidation catalysts for ascorbic acid and its derivatives are water soluble transition metal salts. When such catalysts are combined with an ascorbate compound in a polymeric matrix, e.g., a PVC closure formulation, they are effective in catalyzing the oxidation of the ascorbate compound, and increase the oxygen scavenging rate of the ascorbate.

In each of the above references which disclose the use of ascorbate systems or sulfites, the oxygen scavenging systems use active scavenging agents and, if appropriate, catalysts which have high degrees of water solubility. This has been deemed an important property of the agents to provide an effective oxygen scavenging system based on the theory that the agents and the oxygen solubilized in water (from the food ingredient and/or atmospheric moisture trapped in the headspace) all interact in a homogeneous aqueous phase. Thus, high water solubility of the agents and catalyst has been deemed necessary to enhance this interaction and provide for an effective system suitable for commercial application.

However, it has been observed that the water-soluble materials, and in particular, the catalysts, tend to migrate from the polymer matrices in which they are contained causing undesirable effects on the contents (in particular food products) within containers having these materials. Thus, when using these highly water-soluble materials, degradation of the contents due to oxidation is minimized or eliminated but the contents (especially if having water as a component) tend to become discolored, have an off-taste or become odorous.

It is highly desired to provide an effective oxygen scavenging system suitable for packaging applications which has good oxygen absorption capabilities and which does not leach out of the system to adversely effect the color, taste or smell of the packaged material.

It is further desired to provide an improved container which incorporates the subject oxygen scavenging composition as a part of the interior of the container to provide effective oxygen scavenging without adversely effecting the color, taste or smell of the packaged material.

SUMMARY OF THE INVENTION

The present invention is directed to an oxygen scavenging composition capable of providing good oxygen absorption capabilities while not adversely affecting the color, taste or smell of material packaged within a container having said composition as a part thereof. The present oxygen scavenging composition is composed of a polymeric matrix having an ascorbate compound and a substantially water-insoluble, organic compound of a transition metal distributed within the matrix.

In one aspect of the present invention there is provided an oxygen scavenging composition comprising at least one non-polymeric oxygen scavenging material and at least one substantially water-insoluble transition metal compound effective to catalyze the reaction of oxygen with the oxygen scavenging material. In a preferred embodiment of the present invention, the oxygen scavenging composition is composed of at least one water-insoluble oxygen scavenging material and at least one water-insoluble transition metal compound.

In another aspect of the present invention there is provided a polymeric composition comprising a polymer matrix having the above described oxygen scavenging composition incorporated therein.

In a further aspect of the present invention there is provided a shaped structure containing or derived from the above described polymeric composition.

DETAILED DESCRIPTION

Figure 1:
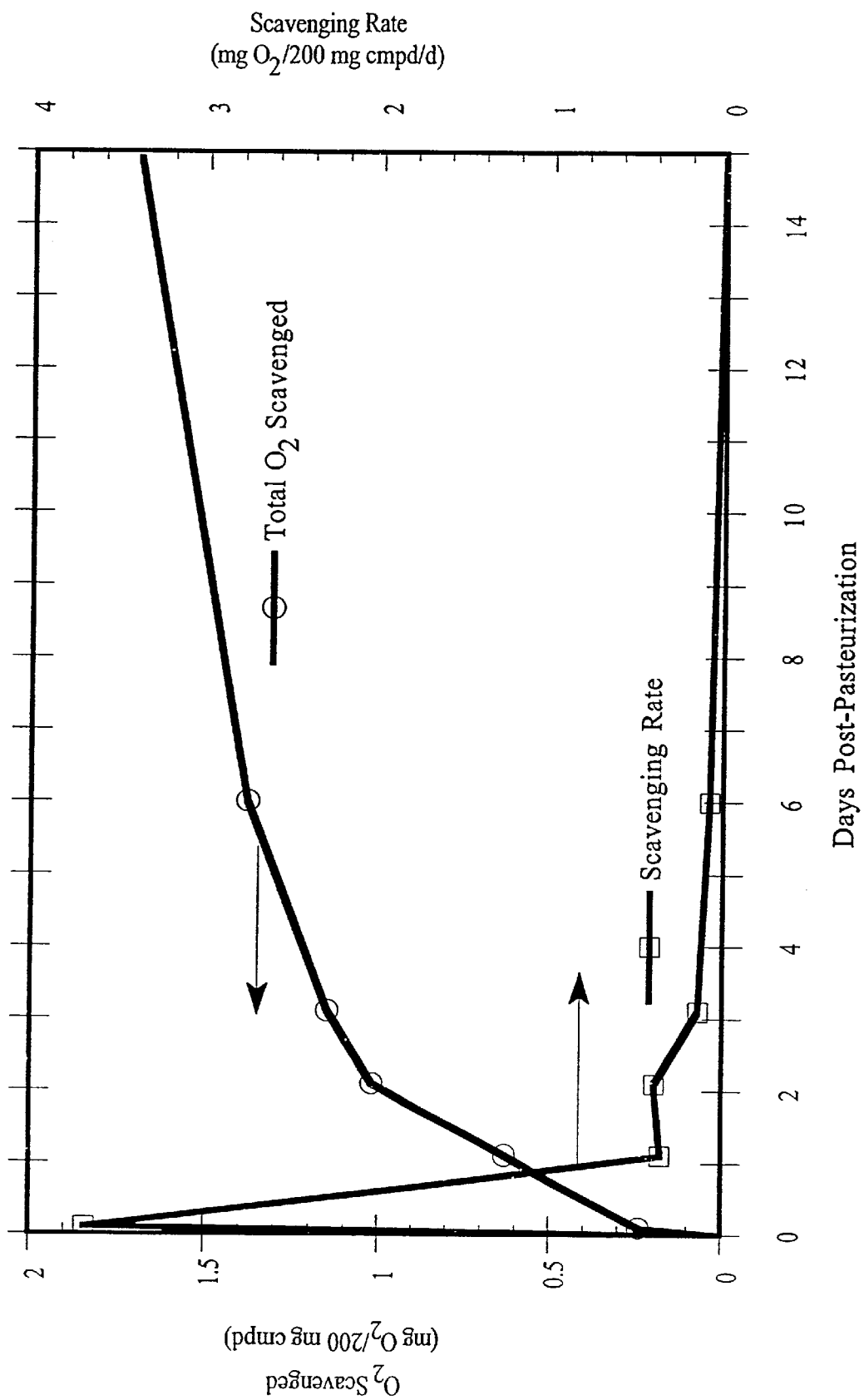
FIG. 1 is a general graph of the capacity and rate of oxygen scavenging of a closure v. time, starting with pasteurization.

The present invention is directed to an oxygen scavenging composition composed of a carrier having a combination of certain oxygen scavenging compounds with a substantially water insoluble transition metal compound distributed within the carrier, as fully described herein below.

The carrier can be a polymer matrix (preferred) in which oxygen scavenging compound and transition metal compound are substantially uniformly distributed, or a film or mat (woven or non-woven) having the oxygen scavenging compound and transition metal compound deposited thereon or therein (e.g., within the voids of the mat), or a moisture permeable pouch or sachet which contain the oxygen scavenging compound and transition metal compound, or a porous ceramic matrix having the oxygen scavenging compound and transition metal compound distributed therein.

The present invention further provides an improved container for packaging materials, such as food, beverages and the like, which are susceptible to oxidative degradation. The present improved container has, as part of the container's interior, the present oxygen scavenging composition and is capable of retaining product quality and enhanced shelf life of the packaged material without adversely effecting the color, taste or smell of the packaged material.

It has been previously deemed necessary that the components of oxygen scavenging systems all have high water solubility in order to provide for the interaction among the oxygen scavenging agent, its catalyst and oxygen (absorbed in the water) in a homogeneous aqueous phase and, thereby, provide a desirable effective oxygen absorption system. It has now been unexpectedly found that high oxygen absorption can be provided by the present oxygen scavenging composition which utilizes a substantially water-insoluble transition metal compound as the catalyst component. In a preferred embodiment of the present invention, the subject oxygen scavenging composition utilizes a substantially water-insoluble oxygen scavenging compound as the oxygen scavenger and a water insoluble transition metal compound as the catalyst component. It has been unexpectedly found that the present scavenging compositions provide high oxygen absorption without adversely effecting the color, taste or odor of the contents within a container having said composition as a part thereof.

In one embodiment of the present invention, the carrier of the subject composition comprises a polymeric matrix material, that is to say polymeric material that will form the matrix of the solidified deposit having distributed therein the oxygen scavenger and the subject transition metal compound. The polymeric matrix material will be selected having regard to the nature of the composition (dispersion, latex, plastisol, dry blends, solution or melt) and its utilization as part of the container in a conventional manner.

The polymeric matrix material may be chosen from at least one polymeric material that can form a solid, or semi-solid matrix. The polymeric matrix material can be derived from a variety of polymers which are available from a variety of bulk physical configurations such as dispersion, latex, plastisol, dry blend, solution or melt (e.g., thermoplastic meltable polymer). The particular physical configuration of the polymer selected for admixture with the oxygen scavenging agent and catalyst will depend on the end structure into which the subject composition is eventually formed or incorporated. The polymeric matrix is derived from polymer types which may be thermoplastic or thermosetting.

The primary function served by the polymer matrix for purposes of the present invention is as a compatible carrier (a material which is stable under normal packaging temperature conditions and does not deactivate the oxygen scavenging ability of the active material) for the oxygen scavenging composition; as an encapsulate to prevent substantial contact of the scavenger to moisture prior to being part of a closed container; and to provide a porous path by which moisture and oxygen can enter and contact the scavenger to trigger (initiate) activation of the oxygen scavenging. The scope of the polymer in general can be very broad. However, the polymer matrix may also be selected to perform additional functions depending on the physical configuration in which it is provided in a final structure into which it is shaped or incorporated. Thus, the particular polymer or mixture of polymers selected ultimately will be determined by the end use in which it exerts its oxygen scavenging effect.

Accordingly, suitable polymers from which the polymeric matrix may be derived include vinyl polymers, polyethers, polyesters, polyamides, phenol-formaldehyde condensation polymers, polysiloxanes, epoxides, ionic polymers, polyurethanes, and naturally occurring polymers such as cellulosics, tannins, polysaccharides, and starches.

Suitable materials for use as the polymeric matrix component of latex compositions, e.g., for can ends, are described in U.S. Pat. No. 4,360,120; U.S. Pat. No. 4,368,828 and EP 0182674. Suitable polymeric materials for use when the compositions are organic solutions or aqueous dispersions are described in U.S. Pat. No. 4,360,120; U.S. Pat. No. 4,368,828; and GB 2,084,601. Suitable materials for use in thermoplastic compositions include the materials proposed in U.S. Pat. No. 4,619,848; U.S. Pat. No. 4,529,740; U.S. Pat. No. 5,014,447; U.S. Pat. No. 4,698,469; GB 1,112,023; GB 1,112,024; GB 1,112,025 and EP 129309. The teachings of each of the references cited hereinabove are incorporated herein by reference.

In particular, the polymeric material can be generally selected from polyolefins as, for example, polyethylene, polypropylene, ethylene/propylene copolymers, acid modified ethylene/propylene copolymers, polybutadiene, butyl rubber, styrene/butadiene rubber, carboxylated styrene/butadiene, polyisoprene, styrene/isoprene/styrene block copolymers, styrene/butadiene/styrene block copolymers, styrene/ethylene/ butylene/styrene block copolymers, ethylene/vinyl acetate copolymers, ethylene/acrylate and ethylene/(meth) acrylate copolymers (for instance, ethylene/butyl acrylate or ethylene/butyl methacrylate copolymers), ethylene/vinyl alcohol copolymers, vinyl chloride homopolymers and copolymers, styrene/acrylic polymers, polyamides, and vinyl acetate polymers, and blends of one or more of these. Polyethylenes found useful in forming the subject composition include high density polyethylene (HDPE), low density polyethylene (LDPE), linear low density polyethylene (LLDPE), ultra-low density polyethylene (ULDPE) and the like as well as copolymers formed from ethylene with one or more other lower alkenes (e.g., octene) and the like.

In this embodiment, particularly preferred compositions according to the invention are thermoplastic compositions formed of polyethylene or copolymers of polyethylene such as, for example, ethylene/vinyl acetate and the like or polyethylene blends such as, for example blends of HDPE and butyl rubber; polyethylene and ethylene/vinyl acetate copolymer; as well as polyethylene and styrene/butadiene/styrene block polymer and the like. The polyethylene, if used, is preferably a low density polyethylene, and may be a very low or ultra low density polyethylene which may be branched or linear. The ethylene/vinyl acetate copolymer, if used, preferably has a melt index in the range 3 to 15, preferably 5 to 10, and generally contains 5 to 40%, preferably 5 to 30%, vinyl acetate.

Further, a plastisol or a dry blend of polymer may be used in combination with an organic solvent or plasticizer for forming the polymer matrix. Suitable materials for use when the compositions are plastisols include vinyl chloride homopolymers and copolymers. Instead of preparing such compositions as true plastisols, they may be provided as dry blends of the polymer and plasticizer. The proportion of plasticizer present in a vinyl resin plastisol may be any conventional proportion, typically from 30 to 150 weight parts of plasticizer per hundred weight parts of vinyl resin.

The polymer matrix of the subject composition may be selected from those used to form coatings on at least a portion of the interior surface of a package (e.g., a rigid container such as a can, can lid, box or the like). The polymer matrix can be selected from polymer classes commonly referred to as epoxides, phenolics, lacquers, polyurethanes and the like.

The polymeric matrix of the composition may further contain conventional plasticizers, including phthalates, adipates, glycols, citrates and epoxidized oils and the like. Examples include for example dioctyl phthalate, diisooctyl phthalate or diisodecyl phthalate, which are readily available. Other usable plasticizers are butyl benzyl phthalate, acetyl tributyl citrate, ethyl diphenyl phosphate and diisobutyl phthalate. One particularly useful combination of plasticizers for use with a vinyl chloride/vinyl acetate copolymer resin is a mixture of diisodecyl phthalate and diisooctyl phthalate in a weight ratio of about 7–8:1.

The polymeric matrix of the subject compositions may contain filler, slip aids, process aids, pigments, stabilizers, anti-oxidants, tackifying resins, foaming agents and other conventional additives in conventional amounts, depending upon the nature of the composition and its final use. If the composition is a thermoplastic composition, the total amount of such additives is generally below 10%, most preferably below 3%, based on the total weight of the composition but when the composition is a plastisol, dispersion, organic solution or latex, the amounts of additives based on polymeric material may be higher. For instance, a large amount of filler may be incorporated. When an anti-oxidant is incorporated, it should be present in amounts capable of stabilizing the polymeric composition against degradation due to free-radicals formed during processing. However, the amount of anti-oxidant should be small enough to permit the oxygen scavenger component of the composition to effectively react with molecular oxygen. The specific amount will depend on the anti-oxidant used and can be determined by minor experimentation.

The composition of the invention which utilizes a polymer matrix as its carrier may be formulated in any convenient form, such as a melt, plastisol, organic solution, dry blend, latex or dispersion. The main ingredients of the composition, apart from the oxygen scavenger and catalyst, are normally typical of those conventionally present for the intended purpose. It is preferred that the total composition should be non-aqueous (i.e., an anhydrous solution, plastisol or thermoplastic melt) so as to prevent premature initiation of the reaction of the scavenger within the composition. Alternatively, the scavenger may be encapsulated or in some other way prevented from contacting water used in forming the subject composition.

The second, third and fourth embodiments of the carriers described hereinbelow are particularly suitable for use with water-insoluble oxygen scavenger and water-insoluble transition metal compounds, as described hereinbelow.

In a second embodiment of the carrier of the present composition, the carrier is in the form of a film or fibrous mat (woven or non-woven) which carries the present oxygen scavenger and catalyst described herein below. The carrier can be formed from a polymeric material, such as those described herein above, capable of forming a film and upon the surface thereof is deposited the present oxygen scavenger. The surface of the film can be coated with the subject oxygen scavenger by forming a suspension or dispersion of the oxygen scavenger powder in a polymer and depositing the suspension or dispersion by a conventional means, such as spraying or knife coating application or the like, directly onto the surface of the carrier film. The particular nature of the carrier film will depend upon the application of its used and the ability of the carrier formed to have the oxygen scavenger adhered to its surface and substantially retain its integrity during use.

The carrier can, alternately, be in the form of a fibrous (woven or non-woven) mat. The oxygen scavenger and catalyst are contained in the interstices of the mat structure. The fibers forming the mat may be formed from any suitable material or synthetic fiber such as cotton, glass, nylon, polyethylene, and copolymers of ethylene with one or more ethylenically unsaturated monomer, polypropylene and copolymers of propylene with one or more ethylenically unsaturated monomer and the like. The with sodium ascorbate powder and a transition metal compound. When the plastisol and additives are uniformly mixed, films are cast into an aluminum mold and heat fused to form a solid rubbery film composition.

To test the oxygen scavenging ability of the prepared films, the fused sample was weighed, placed in a plastic bag (Cryovac® barrier film FS 6055B) with a pH 5.4 phosphate buffer and vacuum sealed. The bag containing the sample was then fitted with an adhesive-backed septum to allow gas to be introduced to the bag, and gas samples withdrawn. The bag was injected with 100 cc of room air (~20.6% oxygen), and the sample pasteurized at 60–65° C. for 45 minutes in a temperature controlled convection oven. Samples were then stored in the dark to avoid photo-oxidation. The headspace oxygen concentration was measured at regular intervals by withdrawing approximately 3 cc samples which were then injected into a MOCON® model 750 Headspace Oxygen Analyzer. Samples were normally prepared in triplicate, and the resulting data averaged. The scavenging rate and scavenging capacity were calculated from the change in oxygen concentration over time, and normalized to a standard sample size of 200 mg (this corresponds to the size of a typical crown liner).

EXAMPLE 1

Approximately 0.35 g of sodium ascorbate (1.76 mmoles) and 0.045 mmoles of catalyst were mixed with sufficient PVC plastisol (Darex® CR 3692M available from W. R. Grace & Co.-Conn.) to form approximately 10 g of plastisol/sodium ascorbate/catalyst blend. A film of the plastisol was cast on aluminum foil and the film fused at 150° C. for 45 sec. in a hot-plate oven. The fused PVC plastisol sample was removed from the foil, weighed, placed in a plastic bag (Cryovac® FS 6055B barrier film, particular nature of the carrier mat will depend upon the application of its use and the ability of the mat to retain oxygen scavenger material within the interstices of the mat structure during use. The scavenger can be deposited into the mat structure by any means such as by dipping the mat into a dispersion or suspension of the scavenger and then removing the liquid from the mat.

In a third embodiment, the subject oxygen scavenger and catalyst described herein below can be retained within a carrier in the form of a pouch or sachet of suitable size to be inserted in a container having an oxygen sensitive material therein. The pouch or sachet should be sufficiently porous to permit moisture and oxygen to penetrate through the pouch or sachet forming material at ambient temperature conditions. The subject oxygen scavenger material is preferably in particulate form which is a sufficient particulate size to permit the sachet structure (e.g., pore size diameter, pore structure) to retain the oxygen scavenger therein. The pouch or sachet can be formed from natural or synthetic materials such as paper, cotton cloth, polymer films and the like in manners well known to the packaging technology.

A fourth embodiment is to utilize a carrier in the form of a porous inorganic material, such as unfired ceramics, having the oxygen scavenger described herein below distributed therein. The inorganic ceramic can be formed into any desired shape (e.g., spheres, cubes, and the like) and size which is suitable for insertion into the container having the oxygen sensitive material. Useful ceramics include clays such as those having kaolinite, montmorillonite or illite along with diaspore, gibbsite and bauxite. Ceramics further include silicas such as quartz, tridymite, cristabalite, diatomite and the like.

An essential feature of the invention is that the subject composition contains an oxygen scavenger, that is to say a reducing agent that can react with gaseous oxygen. The oxygen scavenger is preferably a reducing agent that reacts with gaseous oxygen in a reaction that takes place in the presence of moisture. The total composition should be non-aqueous (i.e., an anhydrous solution, plastisol or thermoplastic melt) or contain the scavenger in encapsulated form so as to prevent initiation of the reaction of the scavenger within the composition prior to activation within the container. Alternatively, when water is used in forming or processing the subject composition the scavenger may be encapsulated or in some other way prevented from contacting the water as used.

The oxygen scavenger agents found useful in providing an effective oxygen scavenging composition of the present invention are ascorbates and isoascorbates (as free acid, salts and derivatives), alkali metal, alkaline earth metal or ammonium sulfite salts or mixtures thereof. The most preferred oxygen scavenger agents are water insoluble ascorbates.

The subject oxygen scavenging composition is preferably formed using ascorbates or isoascorbate compounds or mixtures thereof. The ascorbates and isoascorbates are preferably introduced into the composition as an ionic metal salt such as alkali metal, or alkaline earth metal salt or as an ester of an organic acid (esterified at the 5 or 6 position hydroxyl group of ascorbic acid) or other derivatized ascorbate [e.g., in which the 5 or 6 hydroxyl group is reacted with an organic compound to provide an unsubstituted or substituted (carbonyl, carboxyl, hydroxy,ether) branch group(s) therefrom]. The oxygen scavenger ascorbate and/or isoascorbate component may be supplemented with other known reducing agents as, for example, a second ascorbate or isoascorbate, tannin, sulfite and the like. It is preferred that the ascorbate and/or isoascorbate be the sole oxygen scavenger or at least be the major scavenger agent of a mixture of oxygen scavengers. The term "ascorbate" shall refer herein and in the appended claims unless specifically stated otherwise, to ascorbic acid and isoascorbic acid as the free acid, their salts, their ester derivatives and other derivatives which provide ascorbate capable of reacting with oxygen under redox conditions.

The oxygen scavenging composition can be formed using sulfite salts of an alkali metal, an alkaline earth metal, transition metal or ammonium cation or mixtures of said salts. The sulfites can be used as the sole oxygen scavenging agent or, preferably, can be used in combination with at least one ascorbate. When mixtures are used, it is preferred that the ascorbate be the major scavenging agent of the present composition.

In a preferred embodiment the oxygen scavenging agent can be selected from water-insoluble ascorbate compounds, water-insoluble sulfite salts and mixtures thereof. Water-insoluble sulfites are, for example, alkaline earth metal and transition metal sulfites. Water-insoluble ascorbates are described herein below. The scavenging agent may have any degree of water-insolubility. The lower the water solubility the more preferred the agent. For example, the agent can have water solubility of less than 10 gm per 100 cc water, preferably less than 4 gram, more preferably less than 1 gm and most preferably less than 0.1 gm per 100 cc water at 25° C.

The most preferred oxygen scavenging agents of the present composition are selected from ascorbate compounds which have limited or no water solubility. The ascorbates and isoascorbates are preferably introduced into the composition as an alkaline earth metal salt or as an ester of a fatty acid or other organic derivative (derivatized at either the 5 or 6 or both position hydroxyl group of ascorbic acid). The oxygen scavenger ascorbate component may be supplemented with other known reducing agents as, for example, a second ascorbate or isoascorbate, tannin, a sulfite salt, and the like.

The subject ascorbates are preferably introduced into the above-described polymeric matrix in the form of a substantially water-insoluble salt, as for example, an alkaline earth metal salt, such as calcium ascorbate, barium ascorbate and the like. The ascorbate may also be in the form of a $C_6$–$C_{22}$ fatty acid ester or diester which may be fully saturated or contain unsaturation in the hydrocarbon chain with a $C_{10}$–$C_{22}$ fatty acid ester being preferred. The ascorbate ester may be, for example, ascorbyl laurate, ascorbyl myristate, ascorbyl palmitate, ascorbyl stearate and the like. The saturated acid esters are preferred and most preferred is ascorbyl palmitate.

A third component of the present composition is an oxidation catalyst which has limited or no water solubility. As stated in the Background section herein above, catalyzed systems have been previously used. However, those catalysts had high degrees of water solubility to provide a homogeneous aqueous system wherein the oxidation occurred.

It has been unexpectedly found that one can provide an effective oxygen scavenging composition by utilizing an organic or inorganic transition metal compound which is substantially water insoluble; that is, it is highly hydrophobic and, when the carrier is a polymer matrix, has a high affinity to the organic polymer matrix of the composition. The water-insoluble inorganic transition metal compound may be in the form of a salt or compound in which the transition metal is associated with other elements or groups by ionic or covalent bonds.

The water-insoluble organic transition metal compound may be in the form of a chelant, complex or organic carboxylic acid salt. The water insolubility of the catalyst should be less than 4 grams, preferably less than 2 grams, still more preferably less than 1 gram, and most preferably less than 0.1 gram per 100 cc of water at 25° C. Substantially complete water insolubility is highly desired.

It is preferred that the transition metal compound be a compound having the transition metal in its highest oxidation state. The term "compound" as used herein and the appended claims refers to materials which preferably has the transition metal in its higher active valence state and is bound to a counter moiety as in a salt, complex or other form to provide a stable material. The transition metals are the series of metals in the Periodic Table from scandium to zinc (i.e., Sc, Ti, V, Cr, Mn, Fe, Co, Ni, Cu and Zn). The preferred compounds are those of copper and iron with copper compounds being most preferred. Even though these catalysts have a low propensity to migrate from the carrier, and in particular the polymeric matrix in which they are contained, into the aqueous phase where the oxidation is deemed to occur, it has been unexpectedly found that the present oxygen scavenging composition gives comparable or better performance than typical systems using water soluble catalysts.

Other transition metal compounds providing usable catalysts include transition metal ion-loaded zeolites. It is known that metal loaded zeolites, wherein the metal is in the zero oxidation state, can function as primary oxygen scavengers (see copending application Attorney docket no. 9347, filed of even date) and that at least some of the same metals do not appreciably scavenge oxygen in other oxidation states. It has been found, however, that the metal ion-loaded zeolite with the metal in the higher valence state can be used to catalyze oxygen scavenging activity of another primary oxygen scavenger (See Samples 4, 69 and 70 of Examples 1 and 6 below).

The preferred transition metal compounds are metal salts of mono- and di-carboxylic acids having a carbon chain length of $C_2$–$C_{20}$ or so. The carbon chain can be aliphatic or aromatic, substituted or unsubstituted, and may contain unsaturation, and may be fatty acids. These salts have low to no solubility in water at ambient temperature. Examples of aliphatic monocarboxylic acids include acetic, propionic, butyric, valeric, lauric, tridecanoic, myristic, pentadecanoic, palmitic, stearic, nonadecanoic acids and the like; of aliphatic dicarboxylic acids include malonic, succinic, glutaric, adipic, pimelic, azelaic, sebacic acids and the like; acids having unsaturation include hydrosorbic, sorbic, butyric, glutaconic, hydromuconic, octenedioic acid and the like; and aromatic acids including benzoic acid and the like. The acid may be substituted with hydrocarbyl groups which may be straight or branched chains, typically aliphatic having 1 to 5 carbon atoms or aromatic groups. The acids may have other substitution groups which do not effect the contemplated material to be contained in the resultant package container as is well known by those skilled in the art. The term "fatty acid", when used, is employed for convenience, and it is not intended to signify that it must be derived from natural sources, since it may be manufactured synthetically. The term refers to higher carbon monoacids, preferably having the carboxyl group located terminally. The term "hydrocarbyl" is used herein to include substantially hydrocarbyl groups as well as purely hydrocarbyl groups. The description of these groups as being substantially hydrocarbyl means that they contain no non-hydrocarbyl substituents or non-carbon atoms which significantly affect the hydrocarbyl characteristics or properties of such groups relevant to their uses as described herein.

Thus, the subject oxygen scavenging composition requires a water-insoluble transition metal compound in conjunction with a scavenger agent selected from an ascorbate compound, sulfite salt or mixtures thereof. It is preferred that the catalyst be an organic transition metal compound, as described hereinabove. Further, it is preferred that the scavenger agent be selected from substantially water-insoluble ascorbates or sulfites, as described above. Thus, the preferred combination of scavenger and catalyst is such that both the scavenger and catalyts are water insoluble and most preferred combination is formed from a water-insoluble ascorbate and an organic transition metal compound. The transition metals preferred are copper and iron with copper being most preferred. The agent and catalyst are in a carrier which is preferably a polymer matrix, as described above.

It has been unexpectedly found that the present oxygen scavenging composition gives comparable or better performance than typical systems using water soluble catalyst, even though these catalysts have a low propensity to migrate from the polymeric matrix in which they are contained into the aqueous phase where the oxidation is deemed to occur.

The oxygen scavenger agent may be present in a wide range of amounts depending on the specific application to which the subject composition is applied. Normally, it should be present in at least about 0.1 weight percent based on the polymer matrix of the composition. As exemplified below, amounts of from 0.1 to 90 weight percent, preferably from 1 to 60 and most preferably from 2–60 weight percent provide effective oxygen scavenging when in the present composition.

The amount of the scavenger is dependent on the type of application. When the scavenger is incorporated into a gasket, the amount is normally at least 0.1 weight percent based on the polymeric matrix material, generally at least 1% and preferably at least 2%. It is generally unnecessary for the amount to be above 20% and 4%–10% is often a convenient maximum. Expressed in an alternative manner, the amount of scavenger is typically in the range 0.001 to 2 grams, often 0.02 to 0.1 grams, per container.

When the composition is in the form of a film, coating, mat, pouch or sachet, the oxygen scavenger should be present in an amount to effectively scavenge oxygen during the contemplated storage period of the container for the appropriate contents. The amount is normally in the range of from 0.01 to 2 grams per container of normal size.

In the case of a plastisol, lacquer, or hotmelt applied to the center panel of a closure, where the matrix does not otherwise serve as a gasket, scavenger loadings can be much higher. For example, loadings of 20 weight percent to 60%, or in some cases up to 90%, are workable.

The catalysts described above should be present in the subject composition in mole ratio of ascorbate to transition metal of from about 3000:1 to 20:1 with from 2000:1 to 20:1 being preferred and from 1000:1 to 100:1 being most preferred. In certain applications the ratio may be greater or lesser to provide for effective scavenging of oxygen.

By the invention it is possible to greatly prolong the product quality or shelf life of an oxygen sensitive material in a sealed container by reducing the degree of oxygen degradation.

It is preferred that the scavenger agent remain substantially inert in the subject composition until it is contained within a sealed container. As mentioned above, the composition as whole is preferably anhydrous and the polymeric matrix is also preferably anhydrous. Therefore, the polymeric matrix substantially protects the scavenger agent from moisture under normal atmospheric conditions. Exposure of the composition to the high humidity that normally exists within a sealed container results in sufficient permeation of moisture into the composition as part of the container to initiate a satisfactory degree of scavenging and result in improved shelf life of the packaged material. However, the scavenging reaction can be further accelerated by heating the composition in the closed container to cause increased permeation of moisture. Thus, preferably the scavenger is a material that remains substantially inert in the carrier until the scavenging reaction is accelerated by heating in the presence of moisture.

For example, the scavenging reaction of the present composition is accelerated by pasteurizing (typically at 50° to 100° C.) or sterilizing (typically at 100° to 150° C.) the container after filling it with an aqueous-based fill and sealing it, using the composition of the invention. This triggering appears to be a consequence of the composition, when heated, permitting moisture to permeate into the composition and to become trapped in the composition thereby bringing the scavenger into contact with sufficient water to permit reaction with oxygen. This oxygen may permeate through the composition either from oxygen trapped within the container when it was filled or which subsequently enters the container from the surrounding atmosphere.

It may be desirable to include in that composition a material, for instance a surfactant such as sodium dodecylbenzene sulfonate, which will increase the permeability of the composition to water and a suitable amount of a surfactant such as this is between 0.1 and 1.0% by weight.

The present composition can be used as part of a package container which can provide storage stability to the material packaged therein without detracting from the material's taste, odor or smell. The present composition should be exposed to the inner atmosphere of the resultant sealed container in any form such as a coating on all or a part of the inner surface of the container body or closure means (e.g., lid, can end).

The invention can be applied as a center panel on a container closure. Such a closure could be a cap, can end, lid stock or film. The invention also includes container closures carrying a solid deposit formed on the closure from such a composition and that is positioned to seal around, or over a line of weakness in, the closure. The solid deposit can be a gasket deposited around the closure and formed from the composition. Instead of, or in addition to the deposit being such a gasket, the composition can be deposited on the inner face of a closure at a position where there is a discontinuity or line of weakness around a push or pull component for opening a container sealed by the closure. The closure occupies, as is conventional, only a minor part of the exposed surface area of the closed container, often less than 25% of the surface area. Thus the area of the solid deposit can be very small relative to the area of the container. Despite this, the invention can give greatly improved storage stability.

The invention also includes filled containers sealed with such closures. The sealed container comprises a container body, the closure fitted on it, and the filling that is contained within the container body. The container body is preferably of glass or metal. The closure is preferably of metal.

The filling can be any beverage, foodstuff or other material that is to be stored within the container but the invention is of particular value when the filling is a material whose shelf-life or product quality is normally restricted due to oxygen ingress or contamination during storage. The container body can be a can, generally of metal, in which event the closure is a can end. Generally the entire closure is of metal or polymeric material but the panel of the closure can include a removable component of either metal or polymeric material.

Instead of a can body, the container body can be a bottle or jar in which event the closure is a cap. The bottle or jar is preferably of glass but it can be of polymeric material with very low oxygen permeability. The cap can be of polymeric material, for instance a polypropylene, that may include a barrier layer. Generally, the cap is formed of metal and may include a push or pull component of metal or polymeric material. The cap may be a crown cap such as a pry-off or twist-off crown, a twist-on cap, lug cap, press-on/twist-off, or press-on/pry-off cap, a screw-on cap, roll on metal cap, continuous thread cap, or any other conventional form of metal cap or polymeric cap suitable for closing the bottle or jar.

A gasket is normally provided between the container body and the closure. This gasket (using a polymer matrix carrier) can be used to carry the composition of the invention either as a blend in the gasket composition or as a separate component applied on or near the gasket but it is possible for the composition of the invention to be utilized elsewhere on the closure or elsewhere in the container. In that event the gasket-forming composition can be any unaltered conventional composition suitable for forming the gasket.

When the closure is a cap, the subject scavenger composition may form an overall gasket or a portion of an overall gasket. This is typically true for small diameter caps such as those less than 50 mm in diameter. For large diameter caps, the gasket is a ringlike gasket and may be deposited in a conventional manner from the gasket-forming composition. For instance, a ringlike gasket can be formed on a cap by being applied in liquid form as a ring and can then be converted to solid form by drying, heating to cure or cooling to set a thermoplastic, as appropriate. The oxygen scavenging composition could be blended into the gasket material, deposited on the gasket material, or applied to an area of the cap not covered by the gasket (the center panel). The gasket-forming composition may, for this purpose, be a dispersion, latex, plastisol, suitable thermoplastic composition or organic solution. The cap, carrying the gasket, is then pressed on to an appropriate sealing face around the open end of the filled container body and closed in conventional manner.

If the composition is formed with a thermoplastic polymer matrix, it may be applied as a low viscosity melt while the cap is spinning, so as to throw the composition into the form of a ring, or it may be applied as a melt which is then molded into the desired shape, often a disc having a thickened ring-like portion. Further, the gasket can be in the form of a pre-formed ring or disc which is retained (e.g., by mechanical or adhesive means) within the cap.

If the closure is a can end, the oxygen scavenging material is typically not used in the gasket composition because, under typical can seaming conditions, the gasket is not exposed to oxygen in the pack. Also, the seams are not particularly vulnerable to oxygen ingress. The oxygen scavenging material is typically applied on a center panel or other interior surface in the can as a plastisol or lacquer.

It is particularly preferred that the gasket or coating on the container closure be formed by applying the fluid or molten composition of the present invention formed with a polymer matrix and solidifying it on the closure. The method of application and solidification is generally conventional. It is particularly preferred that the container and can end should both be of metal or the container body should be of glass and the closure of metal or plastic, since the use of the defined compositions for forming the gasket then appears to give particularly beneficial results. In particular, excellent results are achievable when the container body is a glass bottle and the closure is a metal cap.

Instead of or in addition to using the fluid or meltable polymer matrix based composition of the invention for forming a gasket, it is possible to deposit the composition elsewhere on the inner face of the closure. It may be applied as an overall coating of the inner face of the panel of the closure or it may be applied over only part of the inner face. In particular, when the panel includes one or more push or pull components defined in the panel by discontinuities or lines of weakness the composition may be applied primarily to cover just the discontinuity or line of weakness.

For instance one type of closure, usually a can end, includes at least one, and often two, push components that are defined by partial score lines through the metal panel such that finger pressure can push a circular area of the panel into the container, so as to allow access to the contents of the container. Thus there may be a small push component to allow release of pressure and a larger push component to allow pouring of liquid from the container. Such a system is described in, for instance, DE 3,639,426. The present composition may be deposited as an annulus (or a disc) covering the line of weakness. The line of weakness may merely be a weakened line in the metal panel but it can be a total cut around the push component, for instance as in DE 3,639,426, in which event the push component generally has an area slightly larger than the opening in the panel that is defined by the cut line and the composition of the invention can then form a seal between the push component and the remainder of the panel of the closure.

In all instances where push or pull components are to be formed within a metal panel, there is a serious risk that the formation of the push or pull components may damage the polymeric lacquer coating that is generally present on the inner surface of the metal panel. This can expose the metal to corrosion. Application of a composition of the present invention to a container as described herein can both inhibit corrosion of the metal container as well as improve storage stability of the contents of the container, especially water bearing contents, such as beer.

In addition to use in metal, glass and plastic containers, the compositions can be used in a cardboard or laminated container, such as a juice box. Such a container is a cardboard carton or tube with an interior liner. The composition can be placed in or layered with the interior liner of the cardboard package, along a line of weakness at the package closure, or at any other convenient location in the package.

Further, the compositions utilizing the polymeric matrix carrier can be compounded and extruded into desired shapes when the polymer matrix is a thermoplastic resin. For example, the subject compositions can be formed into films per se or as a component of a film composition which can be used to prepare flexible packaging such as bags, or the films can be laminated onto metal stock which can then be formed into cans and closures. Also, the compositions may be included in flexible packaging such as multilayer films or laminates or as a ribbon, patch, label or coating on a thermoplastic bag or lidstock. When the subject composition is part of a multi-layer film, the layer formed of the present composition should be the surface layer which will be exposed to the inner surface of the resultant flexible package or should be an inner layer which is covered by a surface layer having high porosity to permit the $O_2$ laden moisture to penetrate into an contact the layer of the present composition. Thus, the term "exposed to the inner atmosphere", as used herein and in the appended claims shall mean either direct or indirect exposure of the subject composition to the inner atmosphere of a sealed container having material contained therein.

The compositions can also be used in conjunction with or as a portion of a tamper-evident membrane for pharmaceuticals and foods.

The following examples are given for illustrative purposes only and is not meant to be a limitation on the claims appended hereto. All parts and percentages are by weight unless otherwise indicated.

The materials of this invention are prepared as follows. A PVC plastisol (Darex® CR 3692M) is blended available from W. R. Grace & Co.-Conn.) with 10 ml of pH 5.4 phosphate buffer and vacuum sealed. The bag containing the sample was then fitted with an adhesive-backed septum to allow gas to be introduced to the bag, and gas samples withdrawn. The bag was injected with 100 cc of room air (~20.6% $O_2$), and the sample pasteurized at 60–65° C. for 45 min. in a temperature controlled convection oven. Samples were then stored in the dark to avoid photo-oxidation. The headspace $O_2$ concentration was measured at regular intervals by withdrawing approximately 3 ml samples which were then injected into a MOCON® model 751 Headspace $O_2$ Analyzer. Samples were normally prepared in triplicate, and the resulting data averaged. The scavenging rate and scavenging capacity were calculated from the change in oxygen concentration over time, and normalized to a standard sample size of 200 mg (this corresponds to the size of a typical crown liner). The results are presented below in Table 1.

The scavenging rate during pasteurization and the capacity at 1 day are a measure of how rapidly the oxygen scavenging formulation would scavenge the residual oxygen contained in a food package, while the capacity at 2 weeks measures the "useful" total capacity of the material. The scavenging rate typically peaks during pasteurization then drops rapidly over time (see FIG. 1. below).

Sample 1 shows the scavenging performance of uncatalyzed sodium ascorbate in a fused PVC plastisol. Sample 2, which was formulated with a zeolite free of bound metal ions, shows scavenging performance which is nearly the same as that observed with Sample 1. Sample 3 shows the scavenging performance of a sodium ascorbate/PVC plastisol formulation catalyzed by incorporation of conventional, water-soluble $CuSO_4 \cdot 5H_2O$. The scavenging rate during pasteurization was enhanced and the 2 week capacity was slightly increased. Sample 4 shows that a inorganic zeolite material containing "bound" $Cu^{2+}$ ions can also catalyze sodium ascorbate to provide an effective oxidation scavenging composition having performance comparable to that of the $CuSO_4 \times 5H_2O$ catalyzed sodium ascorbate formulation of Sample 3.

EXAMPLE 2

Approximately 0.525 g of sodium ascorbate (2.65 mmol) and 0.066 mmol of catalyst, as noted, were mixed with 15 g PVC plastisol. This gives a 40:1 mol ratio of sodium ascorbate to metal catalyst. Films were prepared and tested as in Example 1. The sample size was approximately 0.5 g. Several catalysts were tested, the results are shown in Table 2.

TABLE 1

| Sample No. | Formulation | Rate During Pasteurization (mg $O_2$/200 mg/d) | Capacity 1 Day (mg $O_2$/200 mg) | Capacity 2 Weeks (mg $O_2$/200 mg) |
|---|---|---|---|---|
| 1* | 3.5% Na Asc | 0.57 | 0.22 ± 0.03 | 1.3 ± 0.03 |
| 2* | 3.5% Na Asc/1.0% USY zeolite (no $Cu^{2+}$) | 0.53 | 0.21 ± 0.02 | 1.3 ± 0.02 |
| 3* | 3.5% Na Asc/0.11% $CuSO_2.5H_2O$ | 1.6 | 0.48 ± 0.01 | 1.4 ± 0.02 |
| 4 | 3.5% Na Asc/1.0% $Cu^{2+}$ exchanged USY zeolite (3% $Cu^{2+}$) | 1.2 | 0.38 ± 0.07 | 1.5 ± 0.05 |

*Comparative examples

TABLE 2

Transition Metal Salts as Sodium Ascorbate Catalysts
40:1 Mole Ratio

| Sample No. | Catalyst | Catalyst Solubility[1] $H_2O$ cold (g/100 cc $H_2O$) | Rate During Pasteur. mg $O_2$/200 mg/day | Capacity 1 day (mg $O_2$/200 mg) | Capacity 7 days (mg $O_2$/200 mg) | Capacity 7 days (mg $O_2$/200 mg) |
|---|---|---|---|---|---|---|
| 5* | None | — | 0.60 | 0.23 ± .11 | 0.76 ± .07 | 0.89 ± .05 |
| 6* | $CuCl_2$ | 71 | 1.87 | 0.44 ± .04 | 0.86 ± .04 | 1.02 ± .06 |
| 7 | CuCl | 0.0062 | 1.25 | 0.35 ± .07 | 0.82 ± .06 | 0.97 ± .04 |

TABLE 2-continued

Transition Metal Salts as Sodium Ascorbate Catalysts
40:1 Mole Ratio

| Sample No. | Catalyst | Catalyst Solubility[1] $H_2O$ cold (g/100 cc $H_2O$) | Rate During Pasteur. mg $O_2$/200 mg/day | Capacity 1 day (mg $O_2$/200 mg) | Capacity 7 days (mg $O_2$/200 mg) | Capacity 7 days (mg $O_2$/200 mg) |
|---|---|---|---|---|---|---|
| 8 | $Cu_2O$ | insoluble | 1.44 | 0.27 ± .08 | 1.01 ± .04 | 1.14 ± .03 |
| 9 | CuO | insoluble | 0.40 | 0.40 ± .04 | 1.00 ± .05 | 1.19 ± .07 |
| 10 | $CuCO_3 \cdot Cu(OH)_2$ | insoluble | 1.18 | 0.49 ± .04 | 1.10 ± .02 | 1.21 ± .13 |

[1]CRC Handbook of Chemistry and Physics, 66th Ed. 1985
*Comparative samples

As can be seen in Table 2, the water insoluble copper salts increased the scavenging rate and capacity of the sodium ascorbate compared to that of uncatalyzed sodium ascorbate (Sample No. 5). These transition metal salts with low or no water solubility (Sample Nos. 7–10) showed good catalyst activity and were as good as or better in overall performance than the water soluble copper metal salt of comparative Sample 6.

EXAMPLE 3

Approximately 0.525 g of sodium ascorbate (2.65 mmol) and 0.1325 mmol of catalysts, as noted, were mixed with 15 g PVC plastisol. This provided a 20:1 mol ratio of sodium ascorbate to metal catalyst. Films were prepared and tested as in Example 1. However, the sample size was increased to 2 sample discs of approximately 1 gram total weight. This gave a larger surface area which resulted in a larger effect on scavenging rate. Several catalysts were tested and the results are listed in Table 3 below.

As can be seen by the data in Table 3 above, the insoluble transition metal salts provided substantially the same or enhanced oxidation rate of the sodium ascorbate compared to that of uncatalyzed sodium ascorbate (Sample No. 16) and provides substantially the same effective oxygen scavenging capacity as samples containing a soluble metal salt counterpart. The copper salts generally provide the best performance.

EXAMPLE 4

Approximately 2.65 mmoles of sodium ascorbate and 0.1325 mmoles catalyst, as noted, were mixed with 15 g PVC plastisol (Darex® CR3692M) to form a plastisol/sodium ascorbate/catalyst blend. This gives a 20:1 mole ratio of sodium ascorbate to the transition metal. A film of the plastisol was cast in an aluminum mold (2 in. diameter× 20 mil thick disc) and the film fused at 200° C. for 2 minutes in a hot plate oven. The fused PVC plastisol sample was removed from the mold, weighed (samples were approximately 1.6 g), and tested according to the method described in Example 1. The results are reported in Table 4 below.

TABLE 3

Transition Metal Salts as Sodium Ascorbate Catalysts
20:1 Mole Ratio

| Sample No. | Catalyst | Catalyst Solubility[1] $H_2O$ (cold) g/100 cc $H_2O$ | Rate During Pasteurization (mg $O_2$/200 mg/day) | Capacity (mg $O_2$/200 mg) | | |
|---|---|---|---|---|---|---|
| | | | | Day 1 | Day 7 | Day 14 |
| 16* | None | — | 1.10 | 0.36 ± .06 | 0.96 ± .09 | 1.00 ± .12 |
| 17* | $CuSO_4 \cdot 5H_2O$ | 32 | 2.96 | 0.62 ± .13 | 1.17 ± .06 | 1.21 ± .04 |
| 18* | $Cu(NO_3)_2$ | 244 | 1.75 | 0.52 ± .02 | 1.11 ± .04 | 1.11 ± .04 |
| 19 | $Cu(OH)_2$ | insol. | 2.81 | 0.63 ± .08 | 1.19 ± .07 | 1.32 ± .02 |
| 20 | $CuCO_3 \cdot Cu(OH)_2$ | insol. | 2.50 | 0.54 ± .05 | 1.13 ± .04 | 1.27 ± .01 |
| 21* | $NiSO_4$ | 66 | 0.99 | 0.39 ± .01 | 0.88 ± .02 | 0.96 ± .07 |
| 22 | $Ni(OH)_2$ | 0.013 | 1.42 | 0.42 ± .05 | 1.01 ± .08 | 1.12 ± .01 |
| 23 | NiO | insol. | 0.99 | 0.25 ± .01 | 0.76 ± .07 | 0.94 ± .01 |
| 24 | $NiCO_3 \cdot Ni(OH)_2$ | insol. | 0.99 | 0.28 ± .03 | 0.93 ± .09 | 1.05 ± .09 |
| 25* | $Co(NO_3)_2 \cdot 6H_2O$ | 134 | 0.87 | 0.45 ± .11 | 0.86 ± .08 | 0.97 ± .02 |
| 26* | $CoSO_4$ | 36 | 0.91 | 0.41 ± .03 | 0.52 ± .04 | 0.98 ± .05 |
| 27 | $CoCO_3$ | insol. | 1.50 | 0.38 ± .04 | 1.00 ± .03 | 1.11 ± .07 |
| 28 | Co(II,III)O | insol. | 0.21 | 0.27 ± .11 | 0.71 ± .10 | 0.86 ± .16 |
| 29 | $Co(OH)_2$ | .0003 | 0.92 | 0.37 ± .07 | 0.51 ± .07 | 1.01 ± .02 |
| 30 | $Co_3(PO_4)_2$ | insol. | 0.97 | 0.21 ± .03 | 0.69 ± .17 | 0.93 ± .01 |
| 31 | CoO | insol. | 1.15 | 0.23 ± .09 | 0.61 ± .11 | 0.84 ± .01 |

*Comparative Samples

TABLE 4

Catalyzed Sodium Ascorbate 20:1 mole ratio Ascorbate/Metal

| Sample No. | Catalyst | Catalyst Solubility[1] $H_2O$ (cold) g/100 cc $H_2O$ | Rate During Pasteurization (mg $O_2$/200 mg/day) | Capacity (mg $O_2$/200 mg) | | |
|---|---|---|---|---|---|---|
| | | | | Day 1 | Day 7 | Day 14 |
| 38* | None | — | 0.92 ± .10 | 0.25 ± .02 | 0.90 ± .05 | 1.03 ± .04 |
| 39* | $CuSO_4.5H_2O$ | 32 | 2.28 | 0.45 ± .05 | 1.05 ± .03 | 1.11 ± .01 |
| 40 | Copper Powder $Cu_2O$ surface | insol. | 1.08 | 0.45 ± .06 | 1.05 ± .03 | 1.05 ± .05 |
| 41 | Iron Powder $Fe_2O_3$ surface | insol. | 0.89 | 0.23 ± .02 | 0.90 ± .07 | 1.01 ± .02 |
| 42 | $CuSnO_4$ | — | 1.53 | — | 0.88 ± .05 | 1.13 ± .04 |
| 43 | $CuTiO_3$ | — | 1.96 | — | 0.93 ± .02 | 1.16 ± .03 |
| 44 | $CuMoO_4$ | — | 2.33 | — | 1.00 ± .04 | 1.15 ± .01 |
| 45 | $Cu_3(PO_4)_3.3H_2O$ | insol. | 0.95 | 0.35 ± .11 | 1.07 ± .01 | 1.08 ± .01 |
| 46 | $Cu_2(OH)PO_4$ | — | 0.72 | 0.33 ± .01 | 0.91 ± .14 | 1.10 ± .01 |
| 47 | $Cu_2SO_3.H_2O$ | insol. | 1.00 | 0.44 ± .02 | 1.09 ± .03 | 1.15 ± .05 |
| 48 | $FePO_4.2H_2O$ | <.1 | 0.95 ± .13 | 0.22 ± .02 | 0.85 ± .07 | 1.02 ± .05 |
| 49 | $FeSO_3.3H_2O$ | <.1 | 1.10 ± .12 | 0.20 ± .03 | 0.92 ± .05 | 1.03 ± .09 |
| 50 | $Fe_2O_3.xH_2O$ | insol. | 0.94 ± .14 | 0.21 ± .05 | 0.84 ± .10 | 1.01 ± 0.3 |

*Comparative Sample

Again, as can be seen from the data, that the water-insoluble transition metal salt containing compositions function as well or better than comparative Sample 38 (uncatalyzed) or the sample catalyzed with a water soluble salt (Sample 39).

EXAMPLE 5

Cooper Catalyzed Sample Dilution Study

Samples were prepared and tested as detailed in Example 4, with the exception that the copper catalyst was varied in concentration as reported in Table 5. Two samples were prepared without any catalyst and several samples were prepared with varying concentrations of conventional water-soluble copper sulfate, as catalyst agent for comparative purposes. The results show that even very low levels of copper catalyst have a noticeable effect on scavenging capacity versus the control, particularly in boosting the 1 day capacity. The water insoluble copper carbonate(basic) functions very well as a catalyst for the ascorbate system and compositions containing them are substantially as effective as those using the water soluble catalysts.

TABLE 5

Copper Catalyzed Samples

| Sample No. | Catalyst | Mol Ratio asc.:Cu | Pasteurization Rate (mg $O_2$/200 mg/day) | Total Capacity (mg $O_2$/200 mg) | | |
|---|---|---|---|---|---|---|
| | | | | Day 1 | Day 7 | Day 14 |
| 54* | None | — | 1.36 ± .12 | 0.20 ± .02 | 0.77 ± .02 | 0.92 ± .03 |
| 55* | None | — | 1.46 ± .08 | 0.23 ± .04 | 0.84 ± .07 | 0.95 ± .04 |
| 56 | $CuCO_3.Cu(OH)_2$ | 50:1 | 1.51 ± .14 | 0.47 ± .03 | 1.01 ± .09 | 1.09 ± .02 |
| 57 | $CuCO_3.Cu(OH)_2$ | 250:1 | 1.60 ± .05 | 0.44 ± .04 | 0.99 ± .96 | 1.07 ± .06 |
| 58 | $CuCO_3.Cu(OH)_2$ | 500:1 | 1.46 ± .31 | 0.31 ± .06 | 1.01 ± .06 | 1.16 ± .05 |
| 59 | $CuCO_3.Cu(OH)_2$ | 750:1 | 1.55 ± .14 | 0.37 ± .02 | 0.83 ± .17 | 0.98 ± .11 |
| 60 | $CuCO_3.Cu(OH)_2$ | 1000:1 | 1.44 ± .03 | 0.35 ± .07 | 0.93 ± .02 | 1.03 ± .06 |
| 61 | $CuCO_3.Cu(OH)_2$ | 1500:1 | 1.41 ± .01 | 0.27 ± .01 | 0.96 ± .94 | 1.00 ± .10 |
| 62* | $CuSO_4.5H_2O$ | 100:1 | 2.53 ± .12 | 0.55 ± .02 | 1.05 ± .02 | 1.07 ± .94 |
| 63* | $CuSO_4.5H_2O$ | 500:1 | 2.08 ± .26 | 0.48 ± .02 | 1.02 ± .01 | 1.10 ± .02 |
| 64* | $CuSO_4.5H_2O$ | 1000:1 | 1.66 ± .09 | 0.43 ± .03 | 0.99 ± .03 | 1.06 ± .04 |
| 65* | $CuSO_4.5H_2O$ | 1500:1 | 1.29 ± .02 | 0.29 ± .04 | 0.92 ± .06 | 1.04 ± .03 |
| 66* | $CuSO_4.5H_2O$ | 3000:1 | 1.32 ± .16 | 0.39 ± .05 | 0.96 ± .05 | 1.04 ± .05 |

*Comparative Sample

EXAMPLE 6

Cu Loaded Zeolites

Sodium ascorbate (0.525 g, 2.65 mmol) and a zeolite (ZSM 5) having $Cu^2$ ions bound thereto were mixed in 15 g PVC plastisol (Darex® CR 3692M) to give a plastisol/sodium ascorbate/catalyst blend wherein the ascorbate to copper mole ratio is 100:1. A film of the plastisol was cast in an aluminum mold (2 in. diameter×20 mil thick disc) and the film fused at 200° C. for 2 minutes in a hot plate oven. The fused PVC plastisol sample was removed from the mold, weighed (samples were approximately 1.6 g) and tested according to the method described in Example 1. The data are reported in Table 6. The results show that the water insoluble copper loaded zeolites, (Samples 69 and 70) show rate and capacity values comparable to the water soluble copper sulfate Sample (Sample 67).

TABLE 6

Cu** Loaded Zeolite Versus CuSO₄ as Na Ascorbate Catalysts

| Sample # | Catalyst | Mole Ratio Metal/Asc. | Pasteurization Rate (mg O₂/200 mg/day) | Capacity (mg O₂/200 mg) | | |
|---|---|---|---|---|---|---|
| | | | | Day 1 | Day 7 | Day 14 |
| 67* | None | — | 1.59 ± 0.056 | 0.23 ± 0.008 | 0.85 ± 0.05 | 1.04 ± 0.06 |
| 68* | CuSO₄.5 H₂O | 1:100 | 3.74 ± 0.17 | 0.50 ± 0.05 | 1.06 ± 0.03 | 1.21 ± 0.02 |
| 69 | Cu ZSM-5 (1.2% Cu) | 1:100 | 2.37 ± 0.03 | 0.43 ± 0.02 | 1.01 ± 0.05 | 1.07 ± 0.09 |
| 70 | Cu ZSM-5 (4.0% Cu) | 1:100 | 2.76 ± 0.23 | 0.53 ± 0.02 | 1.03 ± 0.01 | 1.10 ± 0.03 |

*Comparative Sample

EXAMPLES 7–11

Since copper transition metal salts give the best catalytic effects, some of the samples described in Examples 1–6 were evaluated for copper ion migration as follows. The pH 5.4 phosphate buffer solutions of the Examples were evaluated by Inductively Coupled Plasma analysis to quantify the amount of copper which migrated out of a PVC plastisol formulation during headspace oxygen scavenging tests.

TABLE 7

Copper Ion Migration (Example 1 Samples)

| Sample No. | Catalyst | Cu Ion Concentration (ppm/200 mg cmpd/100 ml)[1] | Solubility (g/100 cc H₂O) |
|---|---|---|---|
| 1* | (none) | 0.0010 | — |
| 2* | Na⁺USY[2] (no Copper) | 0 | — |
| 3 | Cu⁺⁺USY[3] (3% Cu⁺⁺) | 0.1105 | insoluble |

[1] migration normalized to 200 mg sample size in 100 ml phosphate buffer
[2] Davison Chemical, Division of W.R. Grace: USY grade zeolite
[3] Na USY zeolite ion exchanged with Cu
4) Comparative Samples

TABLE 8

Cu Migration from NaAscorbate/Copper Catalyst Containing Samples 40:1 Mole Ratio (Example 2 Samples)

| Sample No. | Catalyst | Migration (ppm) | Sample wt (g) | Cu Concentration (ppm/200 mg/ (100 ml) |
|---|---|---|---|---|
| 5* | None | 0.089 | 0.4469 | 0.0040 |
| 6* | CuCl₂ | 4.9 | 0.4258 | 0.2302 |
| 8* | Cu₂O | 2.20 | 0.4270 | 0.1030 |
| 9 | CuO | 0.359 | 0.2983 | 0.0241 |
| 10 | CuCO₃.Cu(OH)₂ | 1.79 | 0.3381 | 0.1059 |

*Comparative Sample

TABLE 9

Cu Migration from NaAscorbate/Copper Catalyst Containing Samples 20:1 Mole Ratio (Example 3 samples)

| Sample No. | Catalyst | Migration (ppm) | Sample wt (g) | Cu Concentration (ppm/200 mg/ (100 ml) |
|---|---|---|---|---|
| 16* | None | 0.047 | 0.9281 | 0.0010 |
| 17* | CuSO₄.5H₂O | 70.0 | 1.0911 | 1.2831 |
| 18* | Cu(NO₃)₂ | 82.0 | 1.0893 | 1.5056 |
| 19 | Cu(OH)₂ | 9.30 | 1.1311 | 0.1644 |
| 20 | CuCO₃.Cu(OH)₄ | 25.6 | 0.982 | 0.5214 |

*Comparative Samples

The highly soluble catalysts, such as CuCl₂ (Sample 6), gave the highest copper ion migration levels. The less soluble catalysts (Samples 8, 9 and 10) showed substantially lower (2–7 times lower) migration levels.

The highly soluble catalysts, CuSO₄, (Sample 17) and Cu(NO₃)₂ (Sample 18) have substantially higher migration levels than the low solubility catalysts, Cu(OH)₂ (Sample 19) and CuCO₃ (Sample 20).

TABLE 10

Cu Migration from NaAscorbate/Copper Catalyst
Containing Samples
20:1 Mole Ratio
(Example 4 Samples)

| Sample No. | Catalyst | Migration (ppm) | Sample wt (g) | Cu Concentration (ppm/200 mg/ 100 ml) |
|---|---|---|---|---|
| 38* | None | 0.056 | 1.6539 | 0.0007 |
| 39* | $CuSO_4.5H_2O$ | 57.0 | 1.5733 | 0.7246 |
| 40 | Copper Powder | 10.0 | 1.6522 | 0.1211 |
| 42 | $CuSnO_4$ | 4.59 | 1.7124 | 0.0536 |
| 43 | $CuTiO_3$ | 10.2 | 1.6314 | 0.1250 |
| 44 | $CuMoO_4$ | 4.60 | 1.6155 | 0.0569 |
| 45 | $Cu_3(PO_4)_2.3H_2O$ | 8 | 1.7734 | 0.0902 |
| 46 | $Cu_2(OH)PO_4$ | 9.3 | 1.5814 | 0.1176 |
| 47 | $CuSO_3.H_2O$ | 23.8 | 1.6457 | 0.2892 |

*Comparative Samples

The highly soluble catalysts, such as copper sulfate (Sample 41) again have the highest migration levels. Those materials with lower solubility have noticeably less copper migration. (Samples 40, 42–47)

TABLE 11

Copper Migration of Copper Loaded Zeolites
(Example 6 Samples)

| Sample No. | $O_2$ Scavenger/Catalyst | Migration (ug/g) | g Sample | Cu Concentration (ppm/200 mg/100 ml) |
|---|---|---|---|---|
| 67* | Na Asc | 0.00 | 1.6089 | 0.00 |
| 68* | Na Asc/$CuSO_4$ | 9.00 | 1.5426 | 0.12 |
| 69(A) | Na Asc/Cu/ZSM-5(1.2% Cu) | 2.29 | 1.5773 | 0.029 |
| 69(B) | Na Asc/Cu/ZSM-5(1.2% Cu) | 2.60 | 1.6077 | 0.032 |
| 70(A) | Na Asc/Cu/ZSM-5(4.0% Cu) | 4.11 | 1.6153 | 0.051 |
| 70(B) | Na Asc/Cu/ZSM-5(4.0% Cu) | 3.37 | 1.5408 | 0.044 |

A and B are repeats of the same material
*Comparative Examples

The data shows that the copper loaded zeolites, which are water insoluble, have significantly lower levels of copper migrating into the pack solution and thereby do not detract from the color, taste or odor qualities of the packaged material.

EXAMPLE 12

Approximately 0.525 g of sodium ascorbate (2.65 mmoles) and 0.1325 mmoles of catalyst, as noted, were mixed with 15 g PVC plastisol (Darex® CR 3692M available from W.R. Grace & Co.-Conn.) to form a plastisol/sodium ascorbate/catalyst blend. This yields a 20:1 mole ratio of sodium ascorbate to transition metal catalyst. A film of the plastisol was cast in an aluminum mold (2 in. diameter by 20 mil thick disc) and the film fused at 200° C. for 2 minutes in a hot plate oven The fused PVC plastisol sample was removed from the mold, weighed (samples weighed approximately 1.6 g), placed in a plastic bag (made from FS 6055B film available from W. R. Grace & Co.-Conn.) with 10 ml of pH 5.4 phosphate buffer and vacuum sealed. The bag containing the sample was then fitted with an adhesive-backed septum to allow gas to be introduced into the bag, and gas samples withdrawn. The bag was injected with 100 cc of room air (~20.6% $O_2$), and the sample heated at 60–65° C. for 45 minutes in a temperature controlled convection oven (to simulate pasteurization conditions typical for beverages, e.g., beer). Samples were then stored in the dark to avoid photo-oxidation of the ascorbate. The headspace $O_2$ concentration was measured at regular intervals by withdrawing approximately 3 cc samples which were then injected into a MOCON® model 750 Headspace $O_2$ Analyzer. Samples were normally prepared in triplicate, and the resulting data averaged. The scavenging rate and scavenging capacity were calculated from the change in oxygen contraction over time, and normalized to a standard sample size of 200 mg (this corresponds to the size of a typical liner for crowns used on beer bottles). The results are presented in Table 12.

The scavenging rate during pasteurization and the capacity at 1 day are a measure of how rapidly the oxygen scavenging formulation would scavenge the residual oxygen contained in a food package, while the capacity at 2 weeks measures the "useful" total capacity of the material. The scavenging rate typically peaks during pasteurization then drops rapidly over time.

TABLE 12

20:1 Sodium Ascorbate/Catalyst Ratio

| Sample No. | Catalyst | Rate During Pasteurization (mg $O_2$/200 mg/d) | Capacity 1 Day (mg $O_2$/200 mg) | Capacity 7 Days (mg $O_2$/200 mg) | Capacity 14 Days (mg $O_2$/200 mg) |
|---|---|---|---|---|---|
| 71* | None | 0.92 | 0.27 ± .02 | 0.90 ± .01 | 1.03 ± .01 |
| 72* | $CuSO_4$ | 1.76 | 0.55 ± .02 | 0.95 ± .16 | 1.10 ± .19 |
| 73* | $CuSO_4$ | 2.28 | 0.45 ± .05 | 1.05 ± .03 | 1.11 ± .01 |
| 74* | CuEDTA | 4.23 ± .56 | 0.50 ± .01 | 1.11 ± .04 | 1.19 ± .06 |
| 75 | Cu Citrate[1] | 2.18 | 0.39 ± .02 | 1.04 ± 0.6 | 1.13 ± .05 |
| 76 | Cu(II)2-ethylhexanoate | 1.65 | 0.54 ± .04 | 1.16 ± .02 | 1.24 ± .02 |

TABLE 12-continued

20:1 Sodium Ascorbate/Catalyst Ratio

| Sample No. | Catalyst | Rate During Pasteurization (mg O$_2$/200 mg/d) | Capacity 1 Day (mg O$_2$/200 mg) | Capacity 7 Days (mg O$_2$/200 mg) | Capacity 14 Days (mg O$_2$/200 mg) |
|---|---|---|---|---|---|
| 77 | Cu Palmitate | 3.64 | 0.45 ± .04 | 1.01 ± .01 | 1.04 ± .02 |
| 78 | Cu Linoleate | 1.90 | 0.46 ± .03 | 0.99 ± .03 | 0.99 ± .02 |
| 79 | Cu Oxalate | 1.25 | 0.46 ± .02 | 1.09 ± .06 | 1.20 ± .05 |
| 80 | Cu Tartrate | 0.95 | 0.42 ± .04 | 1.20 ± .11 | 1.13 ± .12 |
| 81 | Cu Ethylacetoacetate | 2.96 ± .69 | 0.45 ± .04 | 1.17 ± .35 | 1.40 ± .47 |
| 82 | Cu Acetylacetonate | 3.02 ± .13 | 0.44 ± .05 | 1.14 ± .02 | 1.27 ± .05 |
| 83 | Copper Glycinate | 2.03 ± .10 | 0.44 ± .03 | 1.05 ± .05 | 1.14 ± .05 |
| 84 | Cu 2,4-pentanedionate | 2.33 ± .24 | 0.44 ± 0.8 | 1.03 ± .06 | 1.15 ± .06 |
| 85 | Cu phthalocyanine | 1.90 ± .03 | 0.39 ± .03 | 0.93 ± .01 | 1.01 ± .09 |
| 86* | Fe$_2$(SO$_4$)$_3$.9H$_2$O | 2.08 | 0.42 ± .03 | 1.10 ± .09 | 1.28 ± .07 |
| 87* | FeEDTA | 1.77 ± .17 | 0.32 ± .04 | 1.12 ± .05 | 1.30 ± .01 |
| 88 | Ferric Tartrate | 0.95 ± .10 | 0.24 ± .03 | 0.98 ± .06 | 1.12 ± .02 |
| 89 | Fe(III) Oxalate | 1.30 ± .16 | 0.25 ± .05 | 1.02 ± .03 | 1.19 ± .08 |
| 90 | Ferric Acetylacetonate | 1.19 ± .08 | 0.31 ± .06 | 0.89 ± .09 | 1.09 ± .08 |
| 91 | Ferric Benzoate | 1.23 ± .06 | 0.29 ± .07 | 1.08 ± .01 | 1.28 ± .09 |
| 92 | Ferric Acetate, Basic | 0.95 ± .01 | 0.22 ± .05 | 0.98 ± .03 | 1.14 ± .05 |
| 93 | Fe Stearate | 0.85 ± .12 | 0.31 ± .05 | 1.12 ± .07 | 1.28 ± .02 |
| 94 | Fe Valerate | 1.12 ± .12 | 0.32 ± .01 | 1.13 ± .03 | 1.23 ± .02 |
| 95 | Fe Tartrate | 0.99 ± .12 | 0.30 ± .04 | 0.99 ± .10 | 1.20 ± .02 |
| 96 | Fe(III)2,4-pentanedionate | 0.90 ± 11 | 0.24 ± .03 | 0.97 ± .05 | 1.13 ± .04 |
| 97 | Ferrocene | 1.03 ± .04 | 0.27 ± .04 | 0.81 ± .08 | 1.02 ± .04 |
| 98 | Sn(IV)Acetate | 1.16 ± .09 | 0.28 ± .04 | 0.81 ± .06 | 1.00 ± .02 |
| 99 | Sn2,4-pentanedionate | 0.71 ± .11 | 0.22 ± .01 | 0.80 ± .01 | 0.91 ± .02 |
| 100 | Co(Salen)$_2$ | 2.04 ± .11 | 0.40 ± .03 | 0.88 ± .14 | 1.07 ± 0.5 |
| 101* | Co(II) Acetate | 1.96 ± .42 | 0.27 ± .07 | 0.86 ± .06 | 0.94 ± .06 |
| 102 | Co$_2$-ethyl hexanoate | 0.92 ± .03 | 0.25 ± .02 | 0.85 ± .08 | 1.03 ± .01 |

Footnote:
[1] 1 mole of Copper Citrate = 4 mole of copper. Used 2.65 mmoles of sodium ascorbate and 0.033 mmoles Cu Citrate = 0.1325 mmoles Cu$^{2+}$ = 20:1 ascorbate:Cu$^{2+}$ catalyst ratio.
*Comparative Samples The data shows that the water insoluble organic transition metal compounds, when used in catalytic amounts in the present compositions, increases the scavenging rate and/or capacity compared to compositions containing uncatalyzed sodium ascorbate (Table 12, Sample 71). Samples containing the copper carboxylate salts, show a substantial increase in scavenging rate and capacity and equal or exceed rates achieved by the water soluble copper sulfate catalyst (Table 12, Samples 72 and 73).

EXAMPLE 13

Approximately 0.525 g of sodium ascorbate (2.65 mmoles) and 0.2650 mmoles of catalyst were mixed with 15 g PVC plastisol (Darex® CR3692M) to form a plastisol/sodium ascorbate/catalyst blend. This gives a ratio of 10:1 sodium ascorbate to metal catalyst. A film of plastisol was prepared and tested as detailed in Example 12. Data is given in Table 13.

TABLE 13

10:1 Sodium Ascorbate/Metal Catalyst

| Sample No. | Catalyst | Pasteurization Rate mg O$_2$/200 mg/day | Total Capacity (mg O$_2$/200 mg) | | |
|---|---|---|---|---|---|
| | | | Day 1 | Day 7 | Day 14 |
| 103* | None | 1.11 ± .02 | 0.27 ± .03 | 0.80 ± .04 | 0.97 ± .05 |
| 104* | None | 1.08 ± .23 | 0.24 ± .04 | 0.77 ± .08 | 0.98 ± .05 |
| 105* | CuSO$_4$.5H$_2$O | 3.18 ± .27 | 0.53 ± .09 | 1.02 ± .01 | 1.13 ± .01 |
| 106 | Cu 2-ethylhexanoate | 3.06 ± .23 | 0.45 ± .06 | 1.07 ± .08 | 1.32 ± .01 |
| 107 | Cu 2-ehtylhexanoate | 3.58 ± .34 | 0.58 ± .05 | 1.11 ± .03 | 1.16 ± .01 |
| 108 | Cu(II)2,4-pentanedionate | 3.17 ± .28 | 0.55 ± .04 | 1.08 ± .06 | 1.17 ± .05 |

TABLE 13-continued

10:1 Sodium Ascorbate/Metal Catalyst

| Sample No. | Catalyst | Pasteurization Rate mg O₂/200 mg/day | Total Capacity (mg O₂/200 mg) | | |
|---|---|---|---|---|---|
| | | | Day 1 | Day 7 | Day 14 |
| 109 | Cu Gluconate | 3.51 ± .10 | 0.51 ± .03 | 1.09 ± .02 | 1.19 ± .09 |
| 110 | Cu Stearate | 3.65 ± .26 | 0.46 ± .04 | 1.04 ± .16 | 1.21 ± .08 |
| 111 | Cu Tartrate | 2.74 ± .08 | 0.41 ± .01 | 1.02 ± .04 | 1.21 ± .03 |
| 112 | Cu Palmitate | 2.51 ± .09 | 0.49 ± .02 | 1.14 ± .04 | 1.14 ± .07 |
| 113 | Cu Linoleate | 2.34 ± .20 | 0.40 ± .06 | 0.51 ± .08 | 0.86 ± .03 |
| 114 | Cu Glycinate | 2.89 ± .28 | 0.59 ± .02 | 1.10 ± .01 | 1.13 ± .04 |
| 115 | Cu Ethyl-acetoacetate | 2.95 ± .33 | 0.56 ± .08 | 1.11 ± .02 | 1.13 ± .05 |
| 116 | Fe Valerate | 1.52 ± .07 | 0.30 ± .03 | 1.24 ± .15 | 1.35 ± .15 |
| 117 | Fe(III)2,4-pentanedionate | 2.28 ± .17 | 0.35 ± .03 | 0.96 ± .05 | 1.24 ± .04 |
| 118 | Fe Stearate | 1.74 ± .09 | 0.29 ± .04 | 0.87 ± .27 | 1.24 ± .11 |
| 119 | Fe Tartrate | 1.92 ± .08 | 0.33 ± .04 | 1.14 ± .01 | 1.38 ± .04 |
| 120 | Zn Stearate | 1.24 ± .21 | 0.29 ± .04 | 0.88 ± .05 | 1.01 ± .06 |
| 121 | Zn 2,4-Pentanedionate | 1.09 ± .04 | 0.26 ± .02 | 0.51 ± .03 | 0.99 ± .02 |

*Comparative Sample

Again, the data shows that the incorporation of many transition metal carboxylic acid salts, particularly those of copper, will significantly catalyze the rate and capacity of the sodium ascorbate scavenging system and provide an effective scavenging composition.

EXAMPLE 14

Approximately 0.525 g of sodium ascorbate (2.65 mmoles) and 0.0265 mmoles of catalyst were mixed with 15 g PVC plastisol (Darex® CR3692M) to form a plastisol/sodium ascorbate/catalyst blend. This gives a ratio of 100:1 sodium ascorbate to metal catalyst. A film of the plastisol was prepared and tested as detailed in Example 12. Data is given in Table 14.

TABLE 14

100:1 mole ratio of Sodium Ascorbate to Catalyst

| Sample | Catalyst | Pasteurization Rate (mgO₂/200 mg/day) | Total Capacity (mg O₂/200 mg) | | |
|---|---|---|---|---|---|
| | | | Day 1 | Day 7 | Day 14 |
| 122* | None | 1.41 ± .24 | 0.25 ± .02 | 0.83 ± .07 | 1.00 ± .02 |
| 123* | CuSO₄.5H₂O | 3.74 ± .17 | 0.50 ± .05 | 1.06 ± .03 | 1.21 ± .02 |
| 124 | Cu Glycinate | 3.70 ± .25 | 0.60 ± .06 | 1.05 ± .03 | 1.15 ± .1G |

*Comparative Sample

The above data shows that the insoluble organic transition metal catalyst provides an effective composition even when present in very low amounts.

EXAMPLE 15

In an effort to exhibit how dilute the organic copper transition metal can be and still have it give a catalytic effect on the sodium ascorbate oxygen scavenging system, approximately 0.525 g of sodium ascorbate (2.65 mmoles) and a copper catalyst (amount varies as detailed in Table 15) were mixed with 15 g PVC plastisol (Darex® CR3692M) to form a plastisol/sodium ascorbate/catalyst composition. A film of the plastisol was prepared and tested as detailed in Example 12. Data is reported in Table 15.

TABLE 15

Dilution Study of Copper Catalysts

| Sample No. | Catalyst | Mole Ratio asc.:Cu | Pasteurization Rate (mg O₂/200 mg/day) | Total Capacity (mg O₂/200 mg) | | |
|---|---|---|---|---|---|---|
| | | | | Day 1 | Day 7 | Day 14 |
| 125* | None | — | 1.36 ± .12 | 0.20 ± .02 | 0.77 ± .02 | 0.92 ± .03 |
| 126* | None | — | 1.46 ± .08 | 0.23 ± .04 | 0.84 ± .07 | 0.95 ± .04 |

TABLE 15-continued

Dilution Study of Copper Catalysts

| Sample No. | Catalyst | Mole Ratio asc.:Cu | Pasteurization Rate (mg $O_2$/200 mg/day) | Total Capacity (mg $O_2$/200 mg) | | |
|---|---|---|---|---|---|---|
| | | | | Day 1 | Day 7 | Day 14 |
| 127* | $CuSO_4 \cdot 5H_2O$ | 100:1 | 3.71 ± .39 | 0.55 ± .02 | 1.10 ± .02 | 1.20 ± .05 |
| 128* | $CuSO_4 \cdot 5H_2O$ | 1000:1 | 1.66 ± .09 | 0.43 ± .03 | 0.99 ± .03 | 1.06 ± .04 |
| 129* | $CuSO_4 \cdot 5H_2O$ | 1500:1 | 1.29 ± .02 | 0.29 ± .04 | 0.92 ± .06 | 1.04 ± .03 |
| 130* | $CuSO_4 \cdot 5H_2O$ | 3000:1 | 1.32 ± .16 | 0.39 ± .05 | 0.96 ± .05 | 1.04 ± .05 |
| 131 | Cu-2-ethylhexanoate | 100:1 | 2.62 ± .22 | 0.53 ± .11 | 1.01 ± .05 | 1.11 ± .01 |
| 132 | Cu-2-ethylhexanoate | 500:1 | 1.87 ± .17 | 0.56 ± .02 | 0.96 ± .01 | 1.01 ± .06 |
| 133 | Cu-2-ethylhexanoate | 1000:1 | 1.64 ± .11 | 0.46 ± .15 | 0.92 ± .06 | 0.97 ± .06 |
| 134 | Cu-2-ethylhexanoate | 1500:1 | 1.39 ± .23 | 0.47 ± .04 | 0.85 ± .12 | 0.92 ± .08 |
| 135 | Cu(II) Gluconate | 100:1 | 2.69 ± .27 | 0.53 ± .06 | 1.03 ± .04 | 1.12 ± .07 |
| 136 | Cu(II) Gluconate | 500:1 | 1.76 ± .13 | 0.41 ± .03 | 0.95 ± .02 | 1.11 ± .03 |
| 137 | Cu(II) Gluconate | 1000:1 | 1.86 ± .12 | 0.34 ± .01 | 0.88 ± .03 | 1.05 ± .05 |
| 138 | Cu(II) Gluconate | 1500:1 | 1.65 ± .20 | 0.26 ± .02 | 0.91 ± .03 | 1.08 ± .04 |

*Comparative Sample

The data shows that even at very low levels of a water-insoluble organic copper compound, a catalytic effect on capacity can still be seen.

EXAMPLE 16

Depending on the desired end use of the oxygen scavenging system, it would be useful to be able to adjust the oxygen scavenging capability of the system. In this example, various ratios of catalyzed and uncatalyzed samples were prepared to demonstrate the range of scavenging properties available.

To 15 g of PVC plastisol (Darex® CR3692M) was added a varying weight percent of sodium ascorbate and a varying amount of copper catalyst, as detailed in Table 16. The samples were prepared and tested as detailed in Example 12. See Table 16 for data.

The data of Table 16 illustrates that the amount of oxygen scavenged by the closure compound can be controlled by the level of addition of the scavenger and the catalyst. For example, increasing the amount of sodium ascorbate incorporated into the closure material increases the rate and total capacity of oxygen scavenged. Adding copper catalyst increases the amount of oxygen scavenged and the rate of scavenging even further.

EXAMPLE 17

3.5 wt. % of sodium ascorbate and copper catalyst (20:1 mole ratio ascorbate to metal) were compounded into Daraform® 6491 (available from W. R. Grace & Co., Container Division), which is predominantly a polyethylene polymer. Films were hot molded in an aluminum mold (2 in. diameter×20 mil thick disc) and the film treated and tested as detailed in Example 12. The results are presented in Table 17 below.

TABLE 16

Increased Scavenger

| Sample | System | Ratio | Rate During Pasteur. (mg $O_2$/200 mg/day) | Total Capacity (mg $O_2$/200 mg) | | |
|---|---|---|---|---|---|---|
| | | | | Day 1 | Day 7 | Day 14 |
| 139* | 3.5% NaAsc | — | 1.08 ± .23 | 0.24 ± .04 | 0.77 ± .08 | 0.98 ± .05 |
| 140 | 3.5% NaAsc/Cu 2-ethylhexanoate | 100:1 | 2.22 ± .32 | 0.46 ± .07 | 1.06 ± .02 | 1.15 ± .03 |
| 141 | 3.5% NaAsc/Cu 2-ethylhexanoate | 10:1 | 3.06 ± .23 | 0.45 ± .06 | 1.07 ± .08 | 1.32 ± .01 |
| 142 | 8% NaAsc/Cu 2-ethylhexanoate | 100:1 | 4.46 ± .44 | 1.21 ± .20 | 2.37 ± .09 | 2.72 ± .09 |
| 143* | 16% NaAsc | — | 1.47 ± .22 | 0.36 ± .02 | 1.05 ± .02 | 1.70 ± .01 |
| 144 | 16% NaAsc/Cu 2-ethylhexanoate | 20:1 | 15.3 ± 1.3 | 2.62 ± .10 | 3.47 ± .05 | 3.47 ± .05 |

*Comparative Samples

TABLE 17

Daraform ® 6491 Samples

| Sample | Catalyst | Rate During Pasteurization mg O$_2$/200 mg/day | Total Capacity (mg O$_2$/200 mg) | | |
|---|---|---|---|---|---|
| | | | Day 1 | Day 7 | Day 14 |
| 145* | None | 0.06 ± .01 | 0.024 ± .009 | 0.088 ± .008 | 0.16 ± .02 |
| 146* | CuSO$_4$.5H$_2$O | 1.04 ± .21 | 0.13 ± .008 | 0.35 ± .02 | 0.49 ± .04 |
| 147 | Cu Acetylacetonate | 1.05 ± .23 | 0.17 ± .01 | 0.42 ± .04 | 0.55 ± .06 |
| 148 | Cu Stearate | 0.85 ± .11 | 0.15 ± .01 | 0.42 ± .06 | 0.53 ± .12 |
| 149 | Cu 2-ethylhexanoate | 1.04 ± .32 | 0.16 ± .05 | 0.35 ± .007 | 0.52 ± .04 |

*Comparative Samples

It can be seen by the data, that the overall scavenging rate and capacity of the sodium ascorbate in the Daraform® 6491 polymer matrix is substantially lower than that seen in the more hydrophilic PVC polymer matrix. The addition of the copper catalysts has a substantial effect on the scavenging rate and capacity of the sodium ascorbate in this polymer matrix. The water insoluble copper carboxylates (Table 17, Samples 147 to 149) function just as well as the comparative, water soluble copper sulfate catalyst (Sample 146).

EXAMPLE 18

Sodium ascorbate and catalyst were mixed with 15 g PVC plastisol (Darex® CR3692M) to form a plastisol/sodium ascorbate/catalyst blend. The sodium ascorbate was added at either 3.5% or 8% by weight loading levels and the catalyst added to give a 20:1 mole ratio of sodium ascorbate to transition metal catalyst. A film of each plastisol was prepared and tested as in Example 12, with the exception that 100 cc of 10% oxygen was used to fill the bags. The resulting data is contained in Table 18 below.

EXAMPLE 19

Sodium ascorbate and catalyst were mixed with 15 g PVC plastisol (Darex® CR3692M) to form a plastisol/sodium ascorbate/catalyst blend. The sodium ascorbate was added at either 3.5% or 8% by weight loading levels and the catalyst added to give a 20:1 mole ratio of sodium ascorbate to transition metal catalyst. A film of each plastisol was prepared and tested as in Example 12, with the exception that 100 cc of 5% oxygen was used to fill the bags. The results are contained in Table 19 below.

TABLE 18

10% O$_2$ Packages

| Sample | System | Pasteurization Rate (mg O$_2$/200 mg/day) | Total Capacity (mg O$_2$/200 mg) | | |
|---|---|---|---|---|---|
| | | | Day 1 | Day 7 | Day 14 |
| 150* | 3.5% NaAsc/none | 0.62 ± .10 | 0.13 ± .02 | 0.47 ± .04 | 0.63 ± .09 |
| 151 | 3.5% NaAsc/Cu 2-ethylhexanoate | 1.29 ± .17 | 0.32 ± .01 | 0.90 ± .01 | 1.00 ± .10 |
| 152 | 3.5% NaAsc/Cu Acetylacetonate | 0.92 ± .22 | 0.39 ± .01 | 0.82 ± .03 | 0.83 ± .07 |
| 153* | 3.5% NaAsc/CuSO$_4$.5H$_2$O | 1.61 ± .15 | 0.46 ± .01 | 0.88 ± .04 | 0.98 ± .08 |
| 154* | 8% NaAsc/none | 0.87 ± .10 | 0.21 ± .02 | 0.58 ± .11 | 0.73 ± .12 |
| 155 | 8% NaAsc/Cu 2-ethylhexanoate | 2.23 ± .33 | 0.86 ± .07 | 1.56 ± .09 | 1.63 ± .10 |
| 156 | 8% NaAsc/Cu Acetylacetonate | 2.22 ± .46 | 0.61 ± .08 | 1.55 ± .06 | 1.64 ± .07 |
| 157* | 8% NaAsc/CuSO$_4$.5H$_2$O | 2.63 ± .44 | 0.96 ± .20 | 1.57 ± .03 | 1.69 ± .02 |

*Comparative Samples

TABLE 19

5% Oxygen Samples

| Sample | System | Rate During Pasteurization (mg O₂/200 mg/day) | Total Capacity (mg O₂/200 mg) | | |
|---|---|---|---|---|---|
| | | | Day 1 | Day 7 | Day 14 |
| 158* | 3.5% NaAsc/none | 0.15 ± .20 | 0.07 ± .02 | 0.14 ± .02 | 0.25 ± .06 |
| 159 | 3.5% NaAsc/Cu(II) Gluconate(100:1) | 0.90 ± .04 | 0.24 ± .02 | 0.58 ± .06 | |
| 160 | 3.5% NaAsc/Cu 2-ethylhexanoate | 0.97 ± .16 | 0.24 ± .02 | 0.62 ± .07 | 0.68 ± .09 |
| 161 | 3.5% NaAsc/Cu Acetylactonate | 0.75 ± .05 | 0.21 ± .04 | 0.51 ± .08 | 0.62 ± .03 |
| 162* | 3.5% NaAsc/CuSO₄.5H₂O | 1.05 ± .10 | 0.33 ± .02 | 0.62 ± .01 | 0.67 ± .18 |
| 163* | 8% NaAsc/none | 0.26 ± .15 | 0.11 ± .02 | 0.37 ± .08 | 0.43 ± .11 |
| 164 | 8% NaAsc/Cu 2-ethylhexanoate | 1.40 ± .66 | 0.42 ± .05 | 0.77 ± .02 | 0.79 ± .03 |
| 165 | 8% NaAsc/Cu Acetylacetonate | 1.07 ± .29 | 0.32 ± .08 | 0.77 ± .02 | 0.78 ± .01 |
| 166* | 8% NaAsc/CuSO₄.5H₂O | 1.82 ± .10 | 0.52 ± .04 | 0.83 ± .08 | 0.83 ± .08 |

*Comparative Sample

EXAMPLE 20

Approximately 0.525 g of sodium ascorbate (2.65 mmoles) and 0.1325 mmoles of catalyst were mixed with 15 g PVC plastisol (Darex® CR 3692M) to form a plastisol/sodium ascorbate/catalyst blend. This gave a 20:1 mole ratio of sodium ascorbate to transition metal catalyst. A film of each plastisol was prepared and tested as in Example 12, with the exception that 100 cc of 1.0% oxygen was used to fill the bags.

TABLE 20

1.0% Oxygen Samples

| Sample | Catalyst | Pasteurization Rate (mgO₂/200 mg/day) | Total Capacity (mg O₂/200 mg) | | |
|---|---|---|---|---|---|
| | | | Day 1 | Day 7 | Day 14 |
| 167* | 3.5% NaAsc/none | 0.07 ± .05 | 0.015 ± .0008 | 0.052 ± .01 | 0.07 ± .02 |
| 168 | 3.5% NaAsc/Cu 2-ethlyhexanoate | 0.18 ± .04 | 0.07 ± .01 | 0.16 ± .005 | 0.17 ± .01 |

*Comparative Example

As can be seen from the data in Tables 18 to 20, reducing the starting concentration of oxygen from 20% to 10%, 5% or 1%, respectively also reduces the pasteurization rate and capacity for the sodium ascorbate system. However, in each case the addition of water-insoluble organic copper catalysts dramatically improves the scavenging of the systems. The water insoluble copper carboxylate salts function as well as the water soluble copper sulfate salt without providing a source of contamination for the food product contained within the package.

EXAMPLE 21

Migration Study

Several samples described in Examples 12–20 were evaluated for copper ion migration as follows. The pH 5.4 phosphate buffer solution used in Examples 71–79 was evaluated by Inductively Coupled Plasma analysis to quantify the amount of copper which migrated out of the PVC plastisol formulation during headspace oxygen scavenging tests. The results are reported in Table 21 below. The samples are those of Examples 12 to 20 hereinabove.

TABLE 21

Cu Migration

| Sample of Ex. 12–20 | Catalysts | Raw Amount Cu (ppm) | Sample wt (g) | Cu Concentration (ppm/200 mg/100 ml) |
|---|---|---|---|---|
| 20:1 Ascorbate: Catalyst Mole Ratio - Example 12 Data | | | | |
| 71* | None | 0.055 | 1.6539 | 0.0007 |
| 72* | CuSO₄.5H₂O | 53 | 1.6266 | 0.6517 |

TABLE 21-continued

Cu Migration

| Sample of Ex. 12–20 | Catalysts | Raw Amount Cu (ppm) | Sample wt (g) | Cu Concentration (ppm/200 mg/100 ml) |
|---|---|---|---|---|
| 73* | $CuSO_4.5H_2O$ | 57 | 1.5733 | 0.7246 |
| 74 | Cu Citrate | 13.9 | 1.5416 | 0.1803 |
| 75 | Cu(II)2-ethylhexanoate | 38 | 1.617 | 0.4700 |
| 76 | Cu palmitate | 14.4 | 1.6738 | 0.1721 |
| 77 | Cu Linoleate | 47 | 1.6464 | 0.5709 |
| 78 | Cu Oxalate | 26.9 | 1.6698 | 0.3222 |
| 79 | Cu Tartrate | 20.9 | 1.6724 | 0.2499 |
| 80 | Cu Ethyl-acetoacetate | 44.6 | 1.6871 | 0.5287 |
| 81 | Cu Acetyl-acetonate | 43.5 | 1.5872 | 0.5481 |
| 82 | Copper Glycinate | 0.056 | 1.7486 | 0.0006 |
| 85 | Cu phthal-acyanine | 0.20 | 1.7034 | 0.0024 |
| 10:1 Ascorbate: Catalyst Mole Ratio - Example 13 Data | | | | |
| 103* | None | 0.055 | 1.6230 | 0.0007 |
| 105* | $CuSO_4.5H_2O$ | 120 | 1.5288 | 1.5699 |
| 106 | Cu 2-ethylhexanoate | 76 | 1.4248 | 1.0668 |
| 108 | Cu(II)2,4-pentanedionate | 65 | 1.6083 | .8083 |
| 109 | Cu Gluconate | 97 | 1.4720 | 1.3179 |
| 110 | Cu Stearate | 103 | 1.5023 | 1.3712 |
| 111 | Cu Tartrate | 60 | 1.5746 | 0.7621 |
| 112 | Cu Palmitate | 62 | 1.4470 | 0.8569 |
| 113 | Cu Linoleate | 85 | 1.6133 | 1.0537 |
| 114 | Cu Glycinate | 66 | 1.6719 | 0.7895 |
| 115 | Cu Ethyl-acetoacetate | 87 | 1.5970 | 1.0895 |
| Example 16 Data | | | | |
| 140 | 3.5% NaAsc/ Cu 2-ethyl-hexanoate 100:1 | 2.71 | 1.6287 | 0.0333 |
| 141 | 3.5% NaAsc/ Cu 2-ethyl-hexanoate 10:1 | 84 | 1.6103 | 1.0433 |
| 142 | 8% NaAsc/ Cu 2-ethylhexanoate 100:1 | 18 | 1.4135 | 0.2547 |
| 143* | 16% NaAsc | 0.06 | 1.6533 | .0007 |
| 144 | 16% NaAsc/Cu 2-ethylhexanoate 20:1 | 148 | 1.6397 | 1.8052 |

Footnote:
1 - Migration normalized to 200 mg sample size contacting 100 ml of phosphate buffered water.
*Comparative Sample.

Samples, which contained no added copper catalyst, gave as expected, very low copper ion migration values. The highly soluble $CuSO_4.5H_2O$ catalyst samples gave the highest copper ion migration levels, compared to the other samples with similar mmoles of $Cu^{2+}$ catalyst. The examples illustrate that the use of water-insoluble copper catalyst can control the level of ions migrating into the package and still provide effective scavenging activity.

EXAMPLE 22

Various oxygen scavenging compositions, containing 8% sodium ascorbate were prepared as described in Table 22a. These compositions contained either a water soluble catalyst ($CuSO_4.5H_2O$), or a non-migratory catalyst as described in this invention (e.g., Cu 2-ethylhexanoate), both at a concentration of 140 ppm (as Cu). Each of the compounds listed in Table 22 was applied as a 150 mg annular ring to a 63 mm lug cap (except for lacquer based formulations, which were applied as a circular coating in the center panel of the cap, having a dry weight of 150 mg, and LDPE/EVA formulations, which were applied as gaskets in a roll-on pilfer proof (ROPP) closures. The caps were closed onto water-filled glass jars using a jet of steam to soften the sealing gasket of the lid (except for the LDPE/EVA formulations, which were applied on water-filled glass bottles, without the use of steam). The packs were then incubated approximately 18 hours at 40° C. The solution in the packs was then concentrated and analyzed by Atomic Absorption Spectroscopy to quantify the amount of copper which had leached out into the packs. The results are shown in Table 22b.

Table 22b shows that in every case, water soluble $CuSO_4.5H_2O$ shows a greater propensity to migrate out of various matrix polymers (e.g., filled and unfilled PVC, organic lacquers, PE/EVA blends) than does a relatively water insoluble copper salt, e.g., Cu 2-ethylhexanoate. In almost every case, global migration levels in formulations containing $CuSO_4.5H_2O$ are higher than the corresponding formulations containing the water insoluble Cu 2-ethylhexanoate catalyst. In addition the water insoluble copper salt catalysts show effectively the same catalytic performance as the more migratory, water soluble copper salts.

TABLE 22a

| Sample No. | Scavenger | Catalyst | Resin | Other Components |
|---|---|---|---|---|
| 169 | 8% sodium ascorbate | Cu 2-ethylhexanoate | PVC | 16% talc., 33% DOP |
| 170* | 8% sodium ascorbate | $CuSO_4.5H_2O$ | PVC | 16% talc., 33% DOP |
| 171 | 8% sodium ascorbate | Cu 2-ethylhexanoate | PVC | 40% DOP |
| 172* | 8% sodium ascorbate | $CuSO_4.5H_2O$ | PVC | 40% DOP |
| 173 | 8% sodium ascorbate | Cu 2-ethylhexanoate | epoxy phenolic lacquer | — |
| 174* | 8% sodium ascorbate | $CuSO_4.5H_2O$ | epoxy phenolic lacquer | — |
| 175 | 8% sodium ascorbate | Cu 2-ethylhexanoate | PVC | 16% talc., 33% DOP |
| 176* | 8% sodium ascorbate | $CuSO_4.5H_2O$ | PVC | 16% talc., 33% DOP |
| 177 | 8% sodium ascorbate | Cu 2-ethylhexanoate | 50% LDPE, 50% EVA | — |
| 178* | 8% sodium ascorbate | $CuSO_4.5H_2O$ | 50% LDPE, 50% EVA | — |

[1]DOP = dioctylphthalate

TABLE 22b

| Sample No. | Cu Migration (mg Cu/g compound) | Global Migration (ppm/250 ml pack) |
|---|---|---|
| 169 | 102 | 37.5 |
| 170* | 172 | 41.2 |
| 171 | 27 | 10.1 |
| 172* | 135 | 12.7 |
| 173 | 6 | 2.6 |
| 174* | 19 | 3.7 |
| 175 | 12 | 27.1 |
| 176* | 79 | 29.0 |
| 177 | 1.7 | 3.1 |
| 178* | 2.4 | 2.4 |

*Comparative sample

EXAMPLE 23

Calcium Ascorbate

Approximately 0.565 g of calcium ascorbate (2.65 mmol "Ascorbate", 1.325 mmol Ca $(Ascorbate)_2$ and 0.1325 mmoles of catalyst were mixed with 15 g PVC plastisol (Darexe® CR 3692M) to form a plastisol/calcium ascorbate/catalyst blend having a 20:1 mole ratio of ascorbate to metal. A film of the plastisol was cast in an aluminum mold and the film fused at 200° C. for 2 minutes in a hot-plate oven. The fused PVC plastisol sample was removed from the mold, weighed (samples weighed approximately 1.6 g), placed in a plastic bag (Cryovac® barrier film FS 6055B) with 10 ml of pH 5.4 phosphate buffer and vacuum sealed. The bag containing the sample was then fitted with an adhesive-backed septum to allow gas to be introduced to the bag, and gas samples withdrawn. The bag was injected with 100 cc of room air (~20.6% $O_2$), and the sample pasteurized at 60–65° C. for 45 minutes in a temperature controlled convection oven. Samples were then stored in the dark to avoid photo-oxidation. The headspace $O_2$ concentration was measured at regular intervals by withdrawing approximately 3 cc samples which were then injected into a MOCON® model 751 Headspace $O_2$ Analyzer. Samples were normally prepared in triplicate, and the resulting data averaged. The scavenging rate and scavenging capacity were calculated from the change in oxygen concentration over time, and normalized to a standard sample size of 200 mg (this corresponds to the size of a typical crown liner). The results are presented in Table 23, Samples 179–181.

The scavenging rate during pasteurization and the capacity at 1 day are a measure of how rapidly the oxygen scavenging formulation would scavenge the residual oxygen contained in a food package, while the capacity at 2 weeks measures the "useful" total capacity of the material. The scavenging rate typically peaks during pasteurization then drops rapidly over time. In Table 23, Sample 179 shows the scavenging performance of uncatalyzed calcium ascorbate in a fused PVC plastisol; Sample 180 shows the scavenging performance of a calcium ascorbate/PVC plastisol formulation catalyzed by incorporation of water-soluble $CuSO_4.5H_2O$; Sample 181 shows the scavenging performance of a calcium ascorbate/PVC plastisol formulation catalyzed by incorporation of water-insoluble copper citrate, the rates and capacity are equivalent to those of the water soluble catalyst Sample 180. Sample 181 illustrates a preferred embodiment of the present invention.

TABLE 23

| | | Molded Samples | | |
|---|---|---|---|---|
| Sample No. | Composition | Rate During Pasteurization (mg $O_2$/200 mg/day) | Capacity 1 Day (mg $O_2$/200 mg) | Capacity 2 Weeks (mg $O_2$/200 mg) |
| 179* | CaAsc | 0.388 | 0.14 ± .02 | 0.69 ± .08 |
| 180* | CaAsc/$CuSO_4$ | 1.344 | 0.32 ± .03 | 0.80 ± .05 |
| 181 | CaAsc/$Cu^{+2}$Citrate | 1.149 | 0.29 ± .02 | 0.76 ± .03 |

*Comparative Sample

EXAMPLE 24

Ascorbyl Palmitate

Approximately 1.10 g of ascorbyl palmitate (2.65 mmoles) and 0.1325 mmoles of catalyst were mixed with 15 g PVC and samples prepared and tested as in Example 23. The results are presented below in Table 24, Samples 182–184.

As discussed in Example 23, the addition of a water insoluble catalyst, copper citrate (Sample 184 of Table 24), more than triples the $O_2$ scavenging capacity of the ascorbyl palmitate, (Sample 182), is equivalent to the system using the water-soluble catalyst, copper sulfate (Sample 183) and provided effective oxygen scavenging systems using water insoluble ascorbate.

CR 3692M available from W. R. Grace & Co.). A film of the plastisol was cast on aluminum foil and the film fused at 150° C. for 45 seconds on a hot-plate. The fused PVC plastisol sample was removed from the foil, weighed (the samples were approximately 1 g), placed in a plastic bag (Cryovac® barrier film FS 6055B) with 10 ml of pH 5.4 phosphate buffer and vacuum sealed. The bag containing the sample was then fitted with an adhesive-backed septum to allow gas to be introduced to the bag, and gas samples withdrawn. The bag was injected with 100 cc of room air (~20.6% $O_2$), and the sample pasteurized at 60–65° C. for 45 minutes in a temperature controlled convection oven. Samples were then stored in the dark to avoid photo-oxidation. The headspace $O_2$ concentration was measured at regular intervals by withdrawing approximately 3 ml samples which were then injected into a MOCON® model 751 Headspace $O_2$ Analyzer. Samples were normally prepared in triplicate, and the resulting data averaged. The

TABLE 24

Molded Samples

| Sample No. | Composition | Rate During Pasteurization (mg $O_2$/200 mg/day) | Capacity 1 Day (mg $O_2$/200 mg) | Capacity 2 Weeks (mg $O_2$/200 mg) |
|---|---|---|---|---|
| 182* | Asc Palm | 0.429 | 0.06 ± .04 | 0.08 ± .03 |
| 183* | Asc Palm/$CuSO_4$ | 0.769 | 0.18 ± .01 | 0.41 ± .02 |
| 184 | Asc Palm/$Cu^{+2}$ Citrate | 0.7143 | 0.17 ± .03 | 0.41 ± .01 |

*Comparative Sample

EXAMPLE 25

The amount of calcium ascorbate and catalyst in the samples was varied as detailed in Table 25. The ascorbate and catalyst were blended with 15 g PVC plastisol (Darex® scavenging rate and scavenging capacity were calculated from the change in oxygen concentration over time, and normalized to a standard sample size of 200 mg (this corresponds to the size of a typical crown liner). The results are presented below in Table 25.

TABLE 25

Calcium Ascorbate/Catalyst Blends

| Sample No. | mmol Ascorbate[1] | mmol Catalyst | Mole Ratio Ascorbate to Metal Ion | Rate During Pasteurization (mg $O_{2/200mg/d}$) | 1 Day $O_2$ Capacity (mg $O_2$/200 mg) | 14 Days $O_2$ Capacity (mg $O_2$/200 mg) |
|---|---|---|---|---|---|---|
| 188[2] | 5.30 | None | — | 0.086 | 0.13 ± .03 | 1.42 ± .15 |
| 189[2] | 5.30 | 0.1325 $CuSO_4$ | 40:1 | 1.840 | 0.47 ± .03 | 2.11 ± .06 |
| 190 | 5.30 | 0.1325 Copper Citrate[3] | 10:1 | 1.240 | 0.40 ± .10 | 2.03 ± .20 |
| 191 | 5.30 | 0.290 Cu(II) 2-ethylhexanoate | 18:1 | 2.143 | 0.37 ± .03 | 2.23 ± .03 |
| 192 | 5.30 | 0.2644 $Cu(OH)_2$ | 20:1 | 1.549 | 0.30 ± .04 | 1.74 ± .09 |
| 193 | 5.30 | 0.264 Cu(II) Stearate | 20:1 | 1.744 | 0.39 ± .15 | 2.29 ± .13 |
| 194[2] | 2.46 | None | — | 0.094 | 0.04 ± .01 | 0.63 ± .10 |
| 195 | 2.46 | 0.0392 Copper Citrate[3] | 16:1 | 1.409 | 0.16 ± .06 | 1.01 ± .07 |
| 196 | 2.46 | 0.1222 Cu(II) 2-ethylhexanoate | 20:1 | 0.810 | 0.17 ± .00 | 0.89 ± .07 |

[1]1 mmol calcium ascorbate = 2 mmol ascorbate.
[2]Comparative Sample
[3]0.1325 mmol Cu citrate (2 $Cu_2C_6H_4O_7.5H_2O$) = 0.53 mmol $Cu^{2+}$ ion.

As can be seen from the data, compositions containing a catalyst gave substantially improved performance over the uncatalyzed samples (188 and 94). Further, the performance of composition having only water insoluble components (Samples 190–193, 195–196) performed equivalent to or even better than the composition having water soluble $CUSO_4$ catalyst of Sample 189.

EXAMPLE 26

Copper Ion Migration

Several samples prepared in Examples 23–25 were evaluated for copper ion migration as follows. The pH 5.4 phosphate buffer solution used in Examples 179–182 was evaluated by Inductively Coupled Plasma analysis to quantify the amount of copper which migrated out of the PVC plastisol formulation during headspace oxygen scavenging. Metal contamination is a known cause for deterioration of the quality of food products. The results are reported in Table 26.

An analysis of the migration data shows that: 1) copper migration increases as mmol ascorbate incorporated into the plastisol increases. This may be due to the ascorbate—Cu complex formed during the oxidative process is more soluble than the Cu catalyst itself. As the solubility of the ascorbate decreases, this effect is lessened.

EXAMPLE 27

Ascorbyl Palmitate and Water Insoluble Catalysts

Samples were prepared and tested as in Example 23, except the formulations were varied as shown in Table 27.

TABLE 26

| Sample No. | mmol Ascorbate | Formulation | Mol Ratio Ascorbate to Metal Ion | Cu Ion Concentration (ppm/200 mg cmpd/100 ml)[1] | Catalyst Solubility (g/100 cc $H^2$) |
|---|---|---|---|---|---|
| 179* | 2.65 | CaAsc/None | — | 0.0007 | — |
| 180* | 2.65 | CaAsc/$CuSO_4$ | 20:1 | 0.3916 | 32 |
| 181 | 2.65 | CaAsc/CuCitrate | 20:1 | 0.1330 | Insol. |
| 182* | 2.65 | Asc Palm/None | — | 0.0000 | — |
| 183* | 2.65 | Asc Palm/$CuSO_4$ | 20:1 | 0.0307 | 32 |
| 184 | 2.65 | Asc Palm/CuCitrate | 20:1 | 0.0014 | Insol. |
| 185* | 5.30 | CaAsc/None | — | 0.0022 | — |
| 186* | 5.30 | CaAsc/$CuSO_4$ | 40:1 | 1.4959 | 32 |
| 187 | 5.30 | CaAsc/Cu(II) 2-ethylhexanoate | 18:1 | 0.8947 | Insol. |
| 188 | 5.30 | CaAsc/$Cu(OH)_2$ | 20:1 | 0.2945 | Insol. |
| 189 | 5.30 | CaAsc/Cu Stearate | 10:1 | 0.2391 | Insol. |
| 190* | 2.46 | CaAsc/none | — | 0.0005 | — |
| 191 | 2.46 | CaAsc/CuCitrate | 16:1 | 0.2492 | Insol. |
| 192 | 2.46 | CaAsc/Cu(II) 2-ethylhexanoate | 20:1 | 01786 | Insol. |

*Comparative Sample

TABLE 27

$Cu^{2+}$ Migration for Various PVC Formulations

| Sample No. | Copper Migration Level[a](ppm Cu/200 mg/100 mg) | Scavenger | Ascorbate Conc.[b] (mmoles/10 g) | Catalysts | Catalyst Conc.[b] (mmoles/10 g) | Catalyst Solubility (g/100 ml) |
|---|---|---|---|---|---|---|
| 193[d] | 0.0018 | ascorbic acid | 1.99 | (none) | | |
| 194[d] | 0.4712 | Na asc | 1.76 | $CuSO_4$ | 0.046 | 32 |
| 195[d] | 1.2831 | Na asc | 1.76 | $CuSO_4$ | 0.088 | 32 |
| 196[d] | 0.0000 | asc palm | 1.76 | (none) | | |
| 197 | 0.0000 | asc palm | 1.76 | Cu octoate[c] | 0.045 | ? |
| 198 | 0.0000 | asc palm | 1.76 | Cu stearate | 0.045 | i |
| 199 | 0.0041 | asc palm | 1.76 | Cu octocate[c] | 0.045 | ? |
| 200[d] | 0.0469 | asc palm | 1.76 | $CuSO_4$ | 0.045 | 32 |

[a]ppm $Cu^{2+}$ in 100 ml water, contacting 200 mg of scavenging crown liner formulation
[b]milli-moles of ascorbate or catalyst in 10 g of scavenging crown liner formulation
[c]octoate = 2-ethylhexanoate
[d]Comparative sample Table 27 shows that the highest copper ion migration is typically associated with water soluble oxygen scavengers, such as sodium ascorbate, combined with water soluble copper catalysts, such as $CuSO_4$ (Samples 194 and 195).

Looking at the data in Tables 26 and 27, it can be seen that essentially no copper migration is observed when water insoluble oxygen scavengers are combined with water insoluble copper catalysts. This combination minimizes off-tastes due to copper contamination of the material being packaged while providing effective oxygen scavenging capacity.

What is claimed:

1. A composition capable of reducing the amount of gaseous oxygen contained in a closed container comprising a carrier containing a mixture consisting essentially of
   i) at least one water-insoluble oxygen scavenging agent selected from water-insoluble ascorbate compounds, water-insoluble sulfite salts or mixtures thereof; and
   ii) at least one water-insoluble transition metal compound; wherein the carrier comprises a polymeric matrix having at least about 0.1 wt. percent of said oxygen scavenging agent, mole ratio of agent to transition metal of from about 3000:1 to 20:1 and the water solubility of agent and transition metal compound is less than 4 gm/100 cc of water at 25° C. (room temperature).

2. The composition of claim 1 wherein the transition metal of the transition metal compound is selected from scandium, titanium, vanadium, chromium, manganese, iron, cobalt, nickel, copper, zinc, tin, or mixtures thereof; the transition metal is in a higher valence state; and said transition metal compound has a water solubility of less than about 4 gram per 100 cc water at 25° C.

3. The composition of claim 1 wherein the transition metal of the transition metal compound is selected from the group consisting of iron, nickel, manganese, cobalt, copper, or mixtures thereof.

4. The composition of claim 2 wherein the transition metal of the transition metal compound is selected from the group consisting of iron, nickel, manganese, cobalt, copper, or mixtures thereof.

5. The composition of claim 1 wherein the transition metal of said transition metal compound is copper.

6. The composition of claim 4 wherein the transition metal of said transition metal compound is copper.

7. The composition of claim 1 wherein the water-insoluble transition metal compound is a $C_2$–$C_{20}$ organic mono- or dicarboxylic acid transition metal salt.

8. The composition of claim 5 wherein the water-insoluble transition metal compound is a $C_2$–$C_{20}$ organic mono- or dicarboxylic acid transition metal salt.

9. The composition of claim 1, 4, 5 or 7 wherein the oxygen scavenging agent is an ascorbate compound.

10. The composition of claim 9 wherein the ascorbate compound is a $C_6$–$C_{22}$ fatty acid ester of ascorbic acid or isoascorbic acid.

11. The composition of claim 10 wherein the ascorbate compound is ascorbyl palmitate.

12. The composition of claim 9 wherein the oxygen scavenging agent is a mixture of a major amount of at least one ascorbate compound and a minor amount of agent selected from tannin, sulfite and mixtures thereof.

13. The composition of claim 1 wherein the polymer matrix comprises a polyolefin homopolymer, polyolefin copolymers and mixtures thereof.

14. The composition of claim 1 wherein the polymer matrix is selected from the group consisting of polyethylene, ethylene/vinyl acetate copolymers, vinyl chlorides homopolymers, vinyl chloride copolymers and blends thereof.

15. The composition of claim 1 wherein the polymer matrix comprises a mixture of at least one polyethylene and at least one ethylene/vinyl acetate copolymer.

16. The composition of claim 1 wherein the polymer matrix comprises a polymer selected from the group consisting of polyolefin, ethylene/vinyl acetate copolymer, butyl rubber, styrene/butadiene rubber, styrene/butadiene/styrene block copolymers, isoprene, styrene/isoprene/styrene block copolymers styrene/ethylene/butylene/styrene block copolymers, and mixtures thereof.

17. The composition of claim 1 wherein the polymer matrix comprises one or more vinyl chloride resin.

18. The composition of claim 1, 2, 4, 3, 5, or 7 wherein the carrier is selected from a film, mat, porous pouch, porous sachet or inorganic ceramic material.

19. The composition of claim 9 wherein the ascorbate compound is a $C_{10}$–$C_{22}$ fatty acid ester of ascorbic acid or isoascorbic acid.

20. The composition of claim 9 wherein the ester is derived from hydroxyl group positioned at the 5, 7 or both position of the ascorbic acid or isoascorbic acid.

21. The composition of claim 9 wherein the water-insoluble ascorbate compound is an alkaline earth metal salt of ascorbic acid or isoascorbic acid.

22. The composition of claim 1, 4, 5 or 7 wherein the oxygen scavenger is a water-insoluble sulfite salt.

23. The composition of claim 22 wherein the water-insoluble sulfite is a salt of an alkaline earth metal, a transition metal or mixtures thereof.

* * * * *